United States Patent
Shi et al.

(10) Patent No.: US 9,503,177 B1
(45) Date of Patent: Nov. 22, 2016

(54) METHODS AND SYSTEMS FOR ALIGNING A SATELLITE RECEIVER DISH USING A SMARTPHONE OR TABLET DEVICE

(71) Applicant: The DIRECTV Group, Inc., El Segundo, CA (US)

(72) Inventors: Yangyang Shi, Belmont, CA (US); Ernest C. Chen, San Pedro, CA (US); Cecilia C. Comeaux, Redondo Beach, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

(21) Appl. No.: 14/660,868

(22) Filed: Mar. 17, 2015

Related U.S. Application Data

(60) Provisional application No. 62/098,255, filed on Dec. 30, 2014.

(51) Int. Cl.
  *G06K 9/00* (2006.01)
  *H04B 7/185* (2006.01)

(52) U.S. Cl.
  CPC .................. *H04B 7/18519* (2013.01)

(58) Field of Classification Search
  None
  See application file for complete search history.

(56) References Cited

U.S. PATENT DOCUMENTS

| | | | |
|---|---|---|---|
| 5,313,215 A | 5/1994 | Walker | |
| 5,463,403 A | 10/1995 | Walker | |
| 5,760,739 A * | 6/1998 | Pauli | H01Q 3/08 342/359 |
| 5,808,583 A * | 9/1998 | Roberts | H01Q 1/125 342/359 |
| 5,978,716 A * | 11/1999 | Kamel | G05D 1/0883 342/357.31 |
| 6,031,507 A | 2/2000 | Aoki | |
| 6,535,177 B1 | 3/2003 | Dhellemmes | |
| 6,538,612 B1 | 3/2003 | King | |
| 6,600,730 B1 | 7/2003 | Davis | |
| 6,686,889 B1 * | 2/2004 | Kwon | H01Q 1/125 342/359 |
| 6,693,587 B1 | 2/2004 | Kuether | |

(Continued)

FOREIGN PATENT DOCUMENTS

| | | |
|---|---|---|
| CN | 1700516 A | 11/2005 |
| EP | 0548844 B1 | 11/1997 |

OTHER PUBLICATIONS

NASA; "Ocean Color Documents", downloaded from the World Wide Web http://www.oceancolor.gsfc.nasa.gov/DOCS/MSL12/master_prodlist.html/, Nov. 20, 2014, 4 pages.

(Continued)

*Primary Examiner* — Soo Park
(74) *Attorney, Agent, or Firm* — Guntin & Gust, PLC; Atanu Das

(57) ABSTRACT

In disclosed examples, a satellite receiver dish (SRD) is peak aligned with a satellite in a geostationary orbit through use of guidance provided by a smartphone or tablet device fixedly attached to the SRD. A camera within the smartphone attached to the SRD can capture an image of a celestial object such as the sun. Celestial object data can be used to determine a predicted location of the sun at the time the image is captured. The predicted location of the sun can be used to determine an expected capture location of the sun within the captured image if the SRD was peak aligned with the satellite. A difference between the actual capture location of the sun and expected capture location of the sun within the capture image can be translated into at least one alignment adjustment for adjusting an azimuth position or an elevation position of the SRD.

20 Claims, 8 Drawing Sheets

(56) References Cited

U.S. PATENT DOCUMENTS

| | | | |
|---|---|---|---|
| 6,937,188 B1 | 8/2005 | Saunders | |
| 7,016,643 B1 | 3/2006 | Kuether | |
| 7,535,292 B2 | 5/2009 | Zhou et al. | |
| 7,555,006 B2 | 6/2009 | Wolfe et al. | |
| 7,595,764 B2 | 9/2009 | Shuster | |
| 7,693,483 B1 | 4/2010 | Norin et al. | |
| 7,706,747 B1 | 4/2010 | Rossell et al. | |
| 7,783,248 B1 | 8/2010 | Comeaux et al. | |
| 7,859,330 B2 | 12/2010 | Zhou et al. | |
| 8,044,872 B2 | 10/2011 | Stroes et al. | |
| 8,260,567 B1* | 9/2012 | Kaplan | G01S 5/16 250/393 |
| 8,296,096 B2* | 10/2012 | Kirby | G01B 11/002 702/150 |
| 8,554,466 B2* | 10/2013 | Hsu | G01C 21/26 455/456.3 |
| 8,837,782 B1* | 9/2014 | Rosenwinkel | G01C 21/02 382/106 |
| 8,982,004 B1 | 3/2015 | Santoru | |
| 9,281,559 B2* | 3/2016 | Ransom | G01S 19/23 |
| 2002/0000931 A1 | 1/2002 | Petronic | |
| 2002/0084941 A1 | 7/2002 | Matz | |
| 2003/0016172 A1 | 1/2003 | Natsume | |
| 2004/0128689 A1 | 7/2004 | Pugel | |
| 2006/0020978 A1 | 1/2006 | Miyagawa | |
| 2007/0080861 A1 | 4/2007 | Norin | |
| 2007/0150923 A1 | 6/2007 | Okamoto | |
| 2007/0195006 A1 | 8/2007 | Frye et al. | |
| 2008/0018995 A1* | 1/2008 | Baun | G02B 7/003 359/399 |
| 2008/0165070 A1 | 7/2008 | Stroes | |
| 2009/0033576 A1 | 2/2009 | Smoyer | |
| 2010/0141526 A1 | 6/2010 | Norin et al. | |
| 2013/0127665 A1 | 5/2013 | Miller | |
| 2013/0135146 A1 | 5/2013 | Ransom | |
| 2013/0271319 A1 | 10/2013 | Trerise | |
| 2014/0315599 A1* | 10/2014 | Teichmann | H04N 5/23229 455/556.1 |
| 2015/0026737 A1 | 1/2015 | Miller | |
| 2015/0219744 A1* | 8/2015 | Eikenberry | G01S 5/163 348/144 |
| 2015/0257126 A1* | 9/2015 | Herz | H04W 68/00 455/414.1 |
| 2016/0036117 A1* | 2/2016 | Whitley | H01Q 1/125 250/395 |
| 2016/0056525 A1* | 2/2016 | Hansryd | H01Q 1/1257 342/359 |

OTHER PUBLICATIONS

AL-Software Team; "Satellite Antenna Alignment", downloaded from the World Wide Web http://www.al-soft.com/saa/satinfo.shtml, Jan. 8, 2014, 5 pages.

DIRECTV; "DIRECTV A3-KaKu HD Installations-Training Final-Perfect 10", Power Point Presentation, Jan. 18, 2006, 48 pages.

Technische Universität München-Lehrstuhl Für Ramfahrttechnik in Co-operation with EUTELSAT Communications; "Calculation of Azimuth, Elevation and Polarization for non-horizontal aligned Antennas, Algorithm Description" Technical Document TD-1205-a, Version 1.3, Feb. 9, 2013, 23 pages.

Technische Universität München-Lehrstuhl Für Ramfahrttechnik in Co-operation with EUTELSAT Communications; "Calculation of Azimuth, Elevation and Polarization for non-horizontal aligned Antennas, Analytic formulas" Technical Document TD-1205-b, Version 1.1, Oct. 23, 2012, 8 pages.

DIRECTV; "GENIE™ User Guide, DIRECTV GENIE™ & Earlier HD DVR Receivers", Dec. 5, 2013, 182 pages.

DIRECTV, Inc.; DIRECTV® Digital Satellite Recorder Troubleshooting Guide, Oct. 8, 2002, 19 pages.

Taplin, Lacey; "How to Re-Peak a DIRECTV Satellite Dish for Better Signal", Jun. 5, 2013, 4 pages.

Wistron Neweb Corporation, "DIRECTV® Antenna Installation Manual SlimLine™ Multi-Satellite Dish Antenna with Integrated Ka/Ku LNBs and Built-in Multi-Switch" Jun. 2006, 15 pages.

DIRECTV, "DIRECTV Standard Professional Installation Guidelines", Retail Version 2, Mar. 30, 2006, 52 pages.

Winetraub, Yonatan; et al.; "Attitude Determination—Advanced Sun Sensors for Pico-satellites", Handasaim School, Tel-Aviv University, Israel; May 31, 20015; 10 pages.

* cited by examiner

METHODS AND SYSTEMS FOR ALIGNING A SATELLITE RECEIVER DISH USING A SMARTPHONE OR TABLET DEVICE

RELATED APPLICATION

This application claims, under 35 U.S.C. §119, the benefit of U.S. Patent Application No. 62/098,255 filed on Dec. 30, 2014. U.S. Patent Application No. 62/098,255 is hereby incorporated herein by reference.

BACKGROUND

A satellite receiver dish (SRD) typically requires alignment during the installation and initial setup of the SRD and potentially during the useful life of the SRD. In many instances and for many customers that obtain an SRD, a specially-trained technician aligns the SRD so that SRD can receive downlink signals from a satellite orbiting the Earth. Without the tools and knowledge of the techniques used by the specially-trained technician, a typical customer that obtains a SRD would be ill-equipped to align the SRD for peak reception of downlink signals from the satellite. A SRD that is not aligned for the peak reception can result in an unsatisfied customer.

OVERVIEW

Several example embodiments are disclosed herein. In one respect, an example embodiment can take the form of a method comprising: (i) determining, by a processor, an adjustment location of a SRD, (ii) determining, by the processor, a SRD adjustment date, (iii) determining, by the processor, a SRD adjustment time, (iv) determining, by the processor, an actual capture location pertaining to a representation of a first celestial object, (v) determining, by the processor, an expected capture location for the representation of the first celestial object based on the adjustment location, the SRD adjustment date, the SRD adjustment time, and the SRD being in a particular alignment with a second celestial object, (vi) translating, by the processor, a difference between the actual capture location for the representation of the first celestial object and the expected capture location for the representation of the first celestial object to at least one alignment adjustment of the SRD for positioning the SRD in the particular alignment with the second celestial object, and (vii) outputting, by the processor, the at least one alignment adjustment.

In another respect, an example embodiment can take the form of a system comprising: a processor, and a computer-readable medium storing computer-readable program instructions that when executed by the processor cause a set of functions to be performed, wherein the set of functions includes: (i) determining an adjustment location of a SRD, (ii) determining a SRD adjustment date, (iii) determining a SRD adjustment time, (iv) determining an actual capture location pertaining to a representation of a first celestial object, (v) determining an expected capture location for the representation of the first celestial object based on the adjustment location, the SRD adjustment date, the SRD adjustment time, and the SRD being in a particular alignment with a second celestial object, (vi) translating, by the processor, a difference between the actual capture location for the representation of the first celestial object and the expected capture location for the representation of the first celestial object to at least one alignment adjustment of the SRD for positioning the SRD in the particular alignment with the second celestial object, and (vii) outputting the at least one alignment adjustment.

In another respect, an example embodiment can take the form of a computer-readable medium storing program instructions, that when executed by a processor, cause a set of functions to be performed, wherein the set of functions includes: (i) determining an adjustment location of a SRD, (ii) determining a SRD adjustment date, (iii) determining a SRD adjustment time, (iv) determining an actual capture location pertaining to a representation of a first celestial object, (v) determining an expected capture location for the representation of the first celestial object based on the adjustment location, the SRD adjustment date, the SRD adjustment time, and the SRD being in a particular alignment with a second celestial object, (vi) translating a difference between the actual capture location for the representation of the first celestial object and the expected capture location for the representation of the first celestial object to at least one alignment adjustment of the SRD for positioning the SRD in the particular alignment with the second celestial object, and (vii) outputting the at least one alignment adjustment.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Example embodiments are described herein with reference to the drawings.

DETAILED DESCRIPTION

I. Introduction

Figure 1:
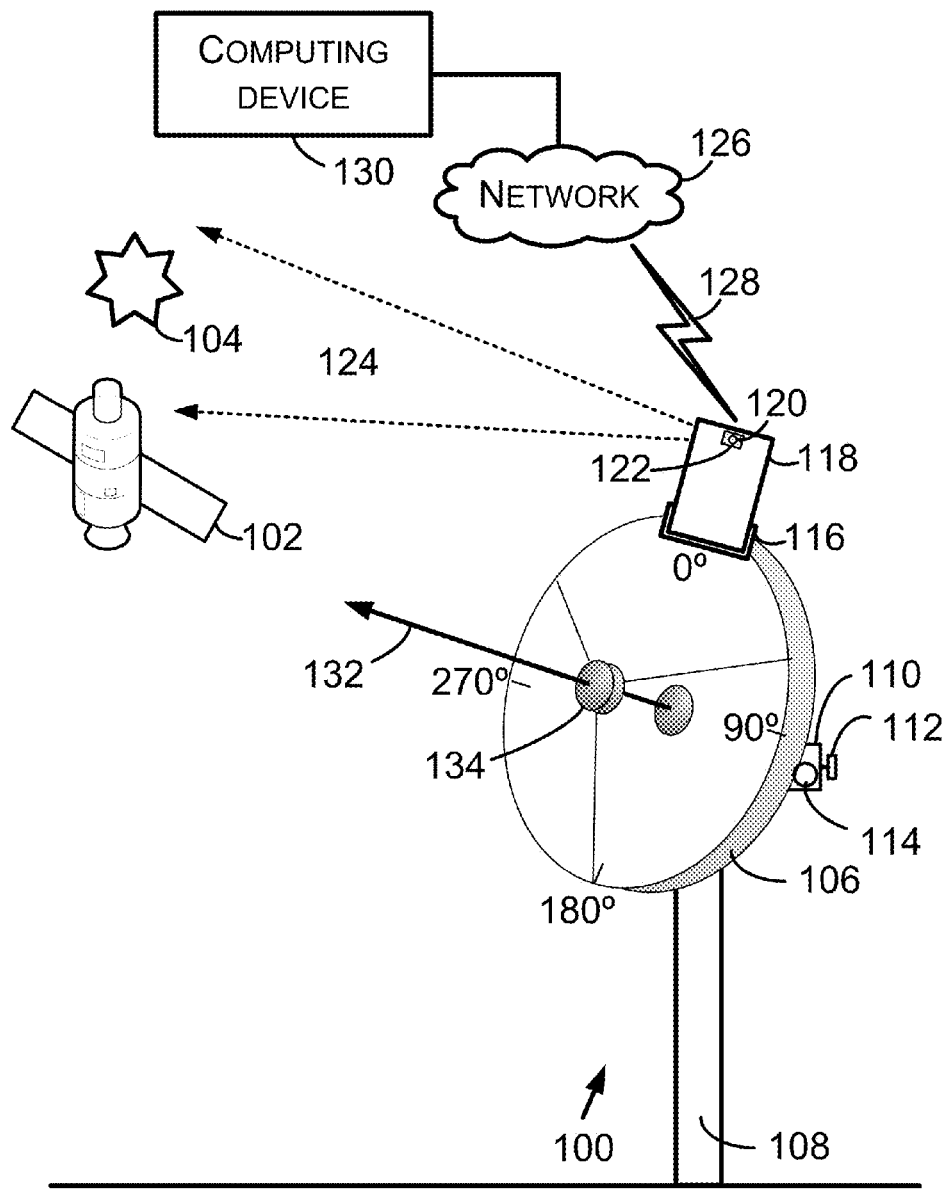
FIG. 1 is a diagram showing a system in accordance with the example embodiments.

This description describes several example embodiments including, but not limited to, example embodiments that pertain to aligning a SRD in a peak alignment with a particular satellite or with a component of the satellite such as a downlink signal transmitter of the satellite. In at least some of the example embodiments, components of a smartphone or a tablet device can be used to guide a user that is performing an initial, rough, alignment of the SRD and to guide the user that is performing a finer (i.e., more precise) alignment of the SRD. The components of the smartphone or the tablet device can include, but are not limited to, one or more of an accelerometer, a gyroscope, a magnetic compass, and a capture device such as a camera within the smartphone or the tablet device. The capture device can be used to capture an image of a celestial object such as the sun or the moon. Knowledge of where the celestial object is expected to be within an image captured by the camera of a smartphone or a tablet device fixedly attached to the SRD can be determined and compared to the expected location of the celestial object within the captured image if the SRD is peak aligned with at least one of the satellite and the satellite component. A difference in the actual and expected locations can be translated to one or more alignment adjustments for peak aligning the SRD. An alignment adjustment can include an instruction for adjusting an alignment mechanism on the SRD.

Peak aligning the SRD can refer to positioning the SRD in an optimum position to a known satellite. Peak aligning the SRD can lead to optimum reception of downlink signals transmitted by satellite. The optimum position can be a position within a number of degrees less than or equal to two degrees (e.g., one or two degrees) from the ideal position in both an elevation dimension and an azimuth dimension. Changing the elevation pointing of the SRD includes moving the SRD perpendicular to horizon of the Earth. Changing the azimuth pointing of the SRD includes moving the SRD parallel to the horizon of the Earth. Peak aligning the SRD can be referred to as "peaking the SRD."

The example embodiments can be beneficial to a customer that purchases a SRD. As an example, a customer may benefit from the example embodiments because the customer can peak align his or her SRD without the need for a professional SRD installer to perform such alignment. Accordingly, the customer may be able to save on installation costs or may not have to wait for the availability of the professional SRD installer.

The example embodiments can also be beneficial to a service provider that provides downlink signals to its customer by a satellite. As an example, a service provider may benefit from the example embodiments since it may not need to hire a professional SRD installer to install the customer's SRD. As another example, a service provider may benefit from the example embodiments since some potential customers may desire to use a service provider that provides an SRD that can be peak aligned by the customer in a manner easier than prior peak alignment procedures.

A smartphone and tablet device can be used as an alignment device to perform one or more functions in at least some of the example embodiments. Accordingly, an increasing number of customers may be able to carry out the functions that can be performed by use of a smartphone or tablet device to peak align an SRD as smartphones and tablet devices have become quite common. The alignment device (e.g., a smartphone or a table device) can be used for satellite pointing detection and for guidance in peak aligning the SRD.

The one or more functions can include capturing an image of the sun or another celestial object that has a predictable location that can enter the field of view of the smartphone's camera viewfinder or display. The image of the celestial object at the predictable location can be used to determine where the object needs to be within the field of view of the smartphone camera for peaking of the SRD. This can be achieved when the smartphone is located in a known relationship to the actual pointing of the SRD to account for a known offset (such as the offset defined by the location at which the smartphone is attached to the SRD). As an example, the offset may be the difference in location, azimuth pointing, and elevation pointing between the center of the smartphone's camera (e.g., a center of the camera's lens) and the center of the satellite antenna's alignment mechanism. In accordance with that example, the information used to align the antenna with the satellite is received at the smartphone's camera, but is implemented at the satellite alignment mechanism. As another example, for a SLIMLINE™ outdoor unit (ODU), such as an AU9-SL5-SWM or an AU9-SL3-SWM available from DIRECTV, LLC, El Segundo, Calif., the smartphone may be mounted with a clip to an upper edge of a reflector of the ODU so that the camera of the smartphone faces the sky. The adjustment of the ODU may be made via a mechanical mechanism that is mounted to a backside of the ODU's reflector.

In this description, the articles "a," "an" or "the" are used to introduce or to refer elements of the example embodiments. The intent of using those articles is that there is one or more of the elements. The intent of using the conjunction "or" within a described list of at least two terms is to indicate any of the listed terms or any combination of the listed terms. For example, in a list of terms recited as "A, B, or C," the combinations indicated by that list of terms include "A and B," "A and C," "B, and C," and "A, B, and C." The use of ordinal numbers such as "first," "second," "third" and so on is to distinguish respective elements rather than to denote a particular order of those elements. The terms "multiple" and "a plurality of" refer to "two or more" or "more than one."

The diagrams, flow charts, and other data shown in the figures are provided merely as examples and are not intended to be limiting. Many of the elements disclosed herein are functional elements that can be implemented as discrete or distributed components or in conjunction with other components, and in any suitable combination and location. The disclosure or description of any element referred to as being disclosed herein can include any illustration of that element in one or more of the figures. Those skilled in the art will appreciate that other arrangements and elements (e.g., machines, interfaces, functions, orders, or groupings of functions) can be used instead. Furthermore, various functions described as being performed by one or more elements can be carried out by a processor executing computer-readable program instructions (CRPI) or by any combination of hardware, firmware, or software. Furthermore still, identical reference numbers used in the same figure or in different figures denote elements that can be identical to other elements referred to by the same reference number, but those denoted elements and the other elements are not so limited.

II. Example Systems

FIG. 1 is a diagram of an example system 100 in accordance with the example embodiments. FIG. 1 shows a celestial object 102 and a celestial object 104. In general, a celestial object is an object in the sky or in outer space relative to Earth. In particular, celestial object 102 can include a satellite. For purposes of this description, the celestial object 102 is referred to as a satellite 102. As an example, the satellite 102 can include a HS-601 or HS-601HP satellite from Hughes Network Systems, LLC, Germantown, Md. (or a BSS-601 from the Boeing Company, Chicago, Ill., which acquired certain satellite platforms from Hughes Network Systems, LLC), a BSS-410 satellite from the Boeing Company, Chicago, Ill., a Eurostar E3000 satellite from Astrium, Paris, France, or some other type of celestial satellite. Also, in particular, celestial object 104 can include the sun around which the Earth revolves or can include the Earth's moon. Accordingly, the celestial objects can be man-made objects or non-man-made objects.

System 100 includes a satellite receiver dish 106, a mast 108 to support the SRD 106, an attachment device 116, an alignment device 118, a network 126, and a computing device 130. The SRD 106 can include an alignment mechanism 110 with multiple directional alignment components such as, but not limited to, an elevation alignment mechanism 112 for changing the elevation pointing of the SRD 106, and an azimuth alignment mechanism 114 for changing the azimuth pointing of the SRD 106. The SRD 106 can include a low noise block (LNB) 134 and the SRD 106. Peak aligning the SRD 106 can include positioning the SRD 106 such that a pointing vector or direction 132 of the SRD 106 is aimed at the satellite 102. The mast 108 can be used to secure the SRD 106 at a fixed location on or above the Earth. Other devices (e.g., brackets, etc.) can be used to secure the SRD 106 at the fixed location on Earth, which can include a structure built on the Earth.

The attachment device 116 can be configured to fixedly attach the alignment device 118 to the SRD 106. As an example, the alignment device 118 does not move with respect to the SRD 106 while the alignment device is fixedly attached to the SRD 106. In some embodiments, it is preferred that the attachment device 116 is positioned so that an angle of error between a plane of a capture device (e.g., a camera) on the phone and a plane normal to the pointing vector 132 of the SRD 106 is minimized. The angle of error being zero or approximate to zero could lead to determining more accurate alignment adjustments as compared to a larger angle of error.

The attachment device 116 can be an integral part of the SRD 106 or can include a device that is removably attachable to the SRD 106. The attachment device 116 can be attached at the LNB 134. The attachment device 116 can include a portion that is attached to the alignment device 118. In accordance with some example embodiments, an alignment device, such as a smartphone or a tablet device, can be fixedly attached for carrying out the peak alignment and afterward can be released and removed from the SRD 106 and at least a portion of the attachment device 116.

In one respect, the attachment device 116 can be a universal attachment device that is configured to attach multiple alignment devices (e.g., any and all types of alignment devices). In another respect, the attachment device 116 can be a specific attachment device configured to attach a particular type of alignment device (e.g., an alignment device embodied within a particular smartphone model). As an example, the attachment device 116 can include a magnet or a magnetic device that attracts a magnet or magnetic device attached to the alignment device 118. As another example, the attachment device 116 can include a mechanism into which the alignment device 118 snaps into to provide a mechanical connection between the alignment device 118 and the SRD 106 and that releases the alignment device 118 from both the SRD 106 and at least a portion of the attachment device 116. As yet another example, the attachment device 116 can include a fixed or adjustable strap to attach the alignment device 118 to the SRD 106.

The alignment device 118 can include capture device for capturing images of objects within a field of view 124. An average field of view may be around 50 degrees (50°) in both a vertical axis and horizontal axis, which is typically wide enough to allow for the capture device to capture an image including a celestial object such as the sun. The capture device can include a lens 120. A filter 122 can be placed over or onto the lens 120. The capture device can include a camera that is separate from a camera phone and tablet device. More details are discussed with respect to an alignment device shown in FIG. 3.

A variety of attachment locations can be defined with respect to the SRD 106. FIG. 1 illustrates four attachment locations defined by a number of degrees (i.e., 0°, 90°, 180°, and 270°) from a particular reference point (e.g., an highpoint of the SRD 106). In FIG. 1, the attachment device 116 is shown as being attached at the 0° attachment location or at least proximate to the 0° attachment location. Other designations can be used to define possible locations for attaching the attachment device 116 on the SRD 106. Furthermore, additional or different attachment locations on the SRD 106 can be defined. Increasing the precision of defining the attachment location can increase an accuracy of determining an adjustment instruction for aligning the SRD 106.

In FIG. 1, the lens 122 is shown as being beyond an outer edge of the SRD 106. In some cases, the alignment device 118 can be rotated (e.g., 180°) such that the lens 122 of the capture device is not located beyond an edge of the SRD 106. In some instances, it may be preferable to align the lens 122 within dimensions of the SRD 106, whereas in some other instances, it may be preferable, or at least acceptable, for the lens 122 to be beyond an outer edge of the SRD 106.

The network 126 can include one or more communication links, one of which can include a communication link 128. The communication link 128, or any other communication link of the network 126, can include a wireless communication link, a wired communication link, or a combination of one or more wireless communication links and one or more wired communication links. The network 126 can include the Internet or a portion thereof.

A wireless communication link can allow for transmission and reception of electrical signals (e.g., electromagnetic waves) without wires connecting the points of transmission and reception. The signals transmitted over a wireless communication link can be arranged according to any of a variety of wireless communication protocols such as, but not limited to, an Institute of Electrical and Electronics Engineers (IEEE) 802.15.1 standard for wireless personal area networks (PANs), a Bluetooth version 4.1 standard developed by the Bluetooth Special Interest Group (SIG) of Kirkland, Wash., or an IEEE 802.11 standard for wireless LANs, which is sometimes referred to as a Wi-Fi standard, a long term evolution (LTE) protocol, a code division multiple access (CDMA) protocol, or a global system for mobile communications (GSM) protocol.

A wired communication link can allow for transmission and reception of signals (e.g., electrical signals or light signals) by one or more wires or cables that connect the points of transmission and reception. The signals transmitted over a wired communication link can be arranged according to any of a variety of wired communication protocols such as, but not limited to, a Transmission Control Protocol (TCP), a User Datagram Protocol (UDP), another Internet Protocol, an asynchronous transfer mode (ATM) protocol, or an IEEE 802.3 protocol developed by the IEEE Ethernet Working Group.

The computing device 130 can include a server and a database to receive, from the alignment device 118, data for determining an alignment adjustment to align the SRD 106. The computing device 130 can determine an alignment adjustment to align the SRD 106 and provide the alignment adjustment to the alignment device 118 over the network 126. At least a part of the database can be integral to or separate from the server. Likewise, a part or all of the functionality of (or performed at) the computing device 130 may reside in (or be performed at) the alignment device 118. In an embodiment in which the alignment device 118 contains essentially all functionality of the computing device 130, the alignment device 126 may be used to carry out a described alignment procedure without use of the network 126 or at least with less use of the network 126. Additional details regarding a computing device are described with respect to the computing device shown in FIG. 5.

Figure 2:
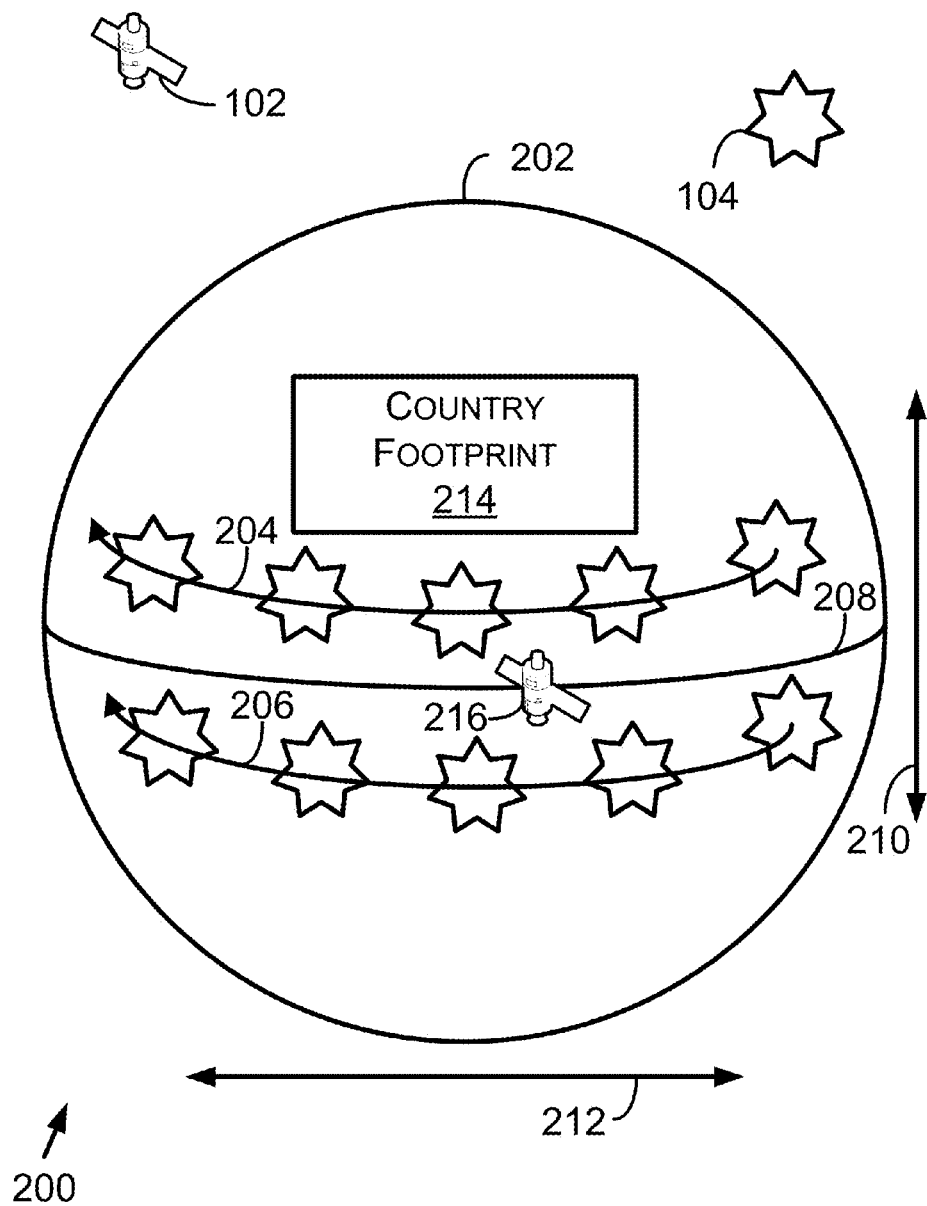
FIG. 2 is a diagram showing the Earth and aspects of the example embodiments.

Next, FIG. 2 is a diagram that illustrates the Earth 202, a country footprint 214 (e.g., a footprint of the United States upon the Earth 202), a location 216 of the satellite 102 to which the SRD 106 can be aligned, the satellite 102, and the celestial object 104. For purposes of describing FIG. 2, the celestial object is the sun 104. The location 216 of the satellite 102 and the celestial object 104 are not drawn to scale because, in reality, the sun is extremely far from the Earth 202 in comparison to the position of the satellite 102. That difference in a look angle between the satellite 102 and the sun 104 impacts how long the sun remains in the viewfinder of a capture device or on the display of the alignment device 118.

The path that the sun 104 sweeps across the Earth 202 and across the country represented by the footprint 214 occurs as the Earth 202 and the satellite 102 are rotating and orbiting around the sun 104. The sun 104 sweeps across the Earth 202 with respect to the location of the Earth's axis of rotation and its orbit around the sun 104 in a different path each day of the year. Paths 204 and 206 are example paths relative to the Earth 202 that the sun 104 takes across the Earth 202 over a given time period (e.g., a day or some part of a day). The paths relative to the Earth 202 that the sun 104 takes across the Earth 202 fluctuate over the course of each year and the seasons of the year.

In FIG. 2, the Earth 202 and the geostationary satellite 102 are shown from a viewing angle away from the surface of the Earth 202, but with the country footprint 214 in view. Since the satellite 102 is in a geostationary orbit, the relative position from any location on the Earth 202 to the satellite 102 is fixed. Accordingly, two parameters with respect to the satellite 102 can be determined for any position on the Earth 202. Those parameters are the azimuth and the elevation that the SRD 106 are to be set to for aligning the SRD 106 for optimum reception of signals transmitted by the satellite 102.

Figure 3:
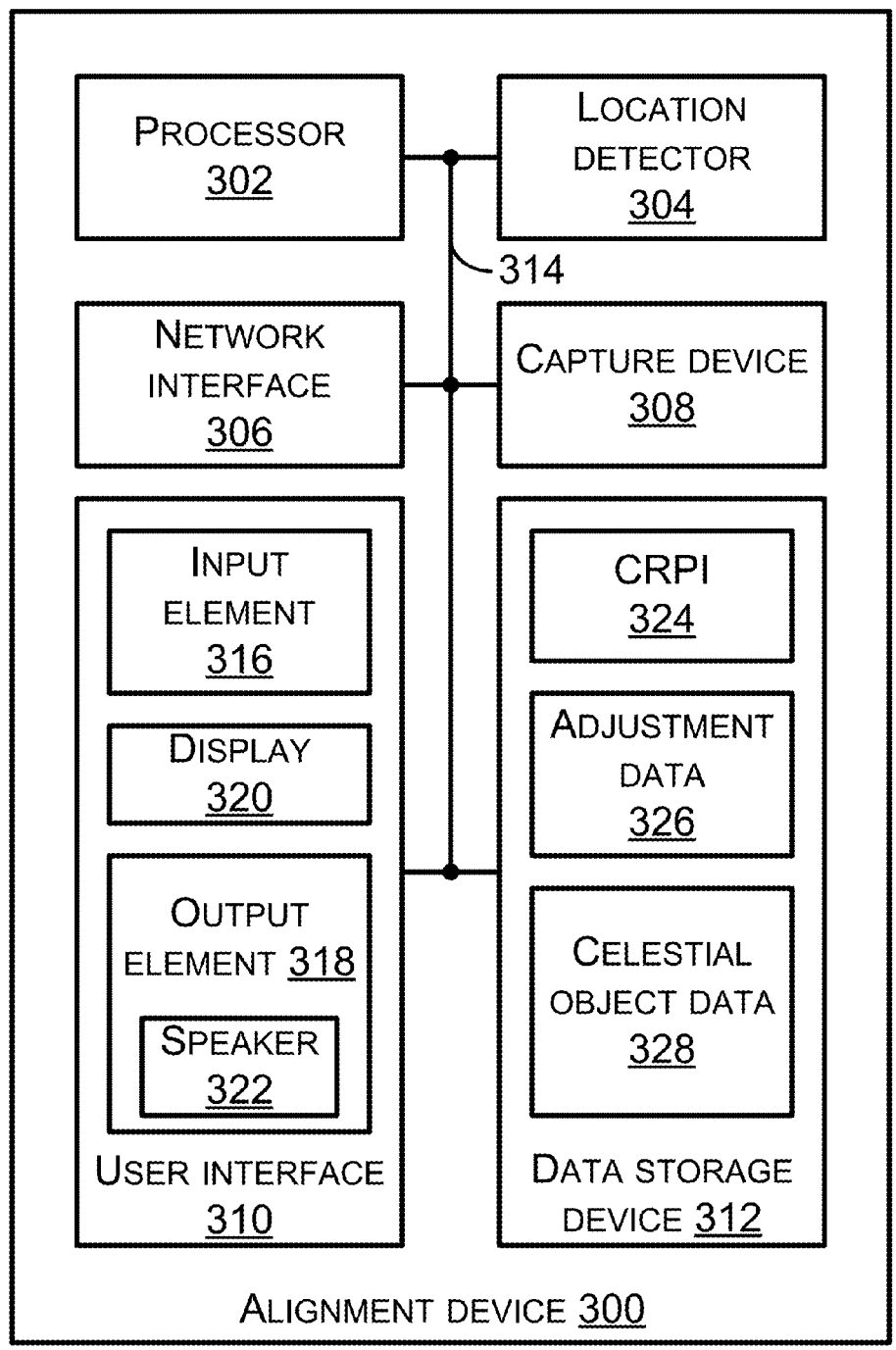
FIG. 3 is a block diagram of an alignment device in accordance with the example embodiments.

Next, FIG. 3 is a block diagram of an alignment device 300 in accordance with the example embodiments. As shown in FIG. 3, the alignment device 300 includes a processor 302, a location detector 304, a network interface 306, a capture device 308, a user interface 310, and a data storage device 312, two or more of which can be communicatively coupled or linked together via a system bus, network, or other connection mechanism 314. The alignment device 300 can be configured to operate in the system 100 in addition to or in place of the alignment device 118. The alignment device 118 can include the alignment device 300 or any one or more components thereof.

The alignment device 300 can include or be configured as a smartphone (such as an IPHONE® smartphone from Apple Inc., Cupertino, Calif., or a GALAXY S® smartphone from Samsung Electronics Co., Ltd., Maetan-Dong, Yeongtong-Gu Suwon-Si, Gyeonggi-Do, Republic of Korea), or a tablet device (such as an IPAD® tablet device from Apple Inc., or a SAMSUNG GALAXY TAB tablet device from Samsung Electronics Co., Ltd.). In accordance with an embodiment in which the alignment device 300 includes or is configured as a smartphone or a tablet device, the CRPI 324 or a portion thereof can include an application downloaded to the alignment device 300 from the APP STORE® online retail store or from the GOOGLE PLAY® online retail store.

A processor, such as the processor 302 or any other processor disclosed herein, can include one or more general purpose processors (e.g., INTEL® single core microprocessors or INTEL® multicore microprocessors) or one or more special purpose processors (e.g., digital signal processors). Additionally or alternatively, a processor can include an application specific integrated circuit (ASIC). The processor 302 can be configured to execute CRPI, such as the CRPI 324.

A data storage device, such as the data storage device 312 or any other data storage device that is disclosed herein, can include a computer-readable medium (i.e., one or more computer-readable mediums). A computer-readable medium can store computer-readable data readable by a processor, such as the processor 302. A computer-readable medium can be referred to by other terms such as, but not limited to, a "computer-readable storage medium," a "data storage device," a "memory device," or a "memory."

A computer-readable medium can include a non-transitory computer-readable medium. A non-transitory computer-readable medium can include volatile or non-volatile storage components, such as optical, magnetic, organic or other memory or disc storage, which can be integrated in whole or in part with a processor, or which can be separate from a processor. A non-transitory computer readable medium can include, but is not limited to, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or any other device that is capable of providing data or executable instructions that may be accessed by a processor, such as the processor 302.

Additionally or alternatively, a computer-readable medium, such as the computer-readable medium 312 or any other computer-readable medium that is disclosed herein, can include a transitory computer-readable medium. The transitory computer-readable medium can include, but is not limited to, a communications medium such as a digital or analog communications medium (e.g., a fiber optic cable, a waveguide, a wired communication link, or a wireless communication link).

The location detector 304 is configured to determine a location and to provide data indicating the location to another element of the alignment device 300, such as the processor 302, the network interface 306, or the data storage device 312. For convenience, the data indicating the location can be referred to as "location data" or a "location." A location determined by the location detector 304 can be an Earth-based location, such as a terrestrial location. For example, the Earth-based location can include latitude and longitude coordinate points for a location on Earth. The Earth-based location can include an elevation. The processor 302 or another component of the example embodiments can associate a location determined by the location detector 304 as a location of the alignment device 300 or as a location of the SRD 106 at which the alignment device 300 is located. In accordance with the example embodiments in which the alignment device 300 is fixedly attached to the SRD 106, a location determined by the location detector 304 can be referred to as either or both of an "SRD adjustment location" and an "adjustment location of the SRD."

In one respect, the location detector 304 can be a separate device within the alignment device 300. In another respect, the location detector 304, or one or more portions thereof, can be integrated within another element of the alignment device 300. As an example, the location detector 304 can include a GPS receiver configured to receive messages or signals broadcast by a GPS satellite. The location detector 304 may need to receive signals from four different GPS satellites to determine a three-dimensional location of the alignment device 300 or the SRD 106. Those GPS satellites are satellites other than the satellite 106. As an example, the satellite 106 may be one of a plurality of satellites that transmit entertainment programs (e.g., television programs) by way of its downlink signals.

The location detector 304 can include one or more of a magnetic compass and an accelerometer. The accelerometer can include multiple accelerometers in the same or different axis. Additionally or alternatively, the location detector 304 can receive, from the network interface 306, data that indicates the location or data that can be used to determine the location. The network interface 306 may receive that location or data from a component, such as a base station, within the communication network 126. The component may use a triangulation method to determine the location or the data that can be used to determine the location of the alignment device 300 or an SRD adjustment location.

A network interface, such as the network interface 306 or any other network interface disclosed herein, can include one or more network interfaces or other devices for receiving data from and transmitting data to a communication network such as, but not limited to, the communication network 126. As an example, the network interfaces disclosed herein can include a transmitter to transmit data to the communication network 126 and a receiver to receive data from the communication network 126. The transmitter and receiver can be standalone devices or can be integrated into a single device (e.g., a transceiver) that is operable to transmit data to and receive data from the communication network 126.

The disclosed network interfaces can communicatively couple the network interface and a device within which or for which the network interface operates to the communication network 126 or to one or more other devices communicatively coupled to the communication network 126 or a communication link thereof. Communicatively coupling two or more devices or a device to the communication network 126 can occur by one or more of a wireless communication link and a wired communication link.

The network interface 306 can receive data to be transmitted over the communication network 126 from another component of the alignment device 300 such as, but not limited to, the processor 302. The data the network interface 306 receives from the communication network 126 can be provided from the network interface 306 to another component of the alignment device 300 such as, but not limited to, the processor 302 or the data storage device 312. As an example, the network interface 306 can transmit one or more the following items to the computing device 130: a SRD adjustment location, a SRD adjustment date, a SRD adjustment time, a representation of a celestial object, a zoom setting of the capture device 308, an attachment location indicating a location where the alignment device 300 is attached to the SRD 106, an SRD-type indicator, a device-type indicator, and any alignment input data disclosed herein. As another example, the network interface 306 can receive one or more of the following items from the computing device 130 or otherwise: celestial object data, an actual capture location pertaining to a representation of a celestial object, an expected capture location for the representation of the celestial object, and an alignment adjustment. Other examples of the items that network interface 306 can transmit or receive are also possible.

The capture device 308 can include one or more components for capturing an image such as, but not limited to, any image disclosed herein. As an example, the capture device 308 can comprise a camera, such as the camera of a smartphone or a tablet device. As another example, the capture device 308 can include an image sensor and a lens. The lens can include a zoom setting. The lens can include a light filter or a light filter can be placed onto or over the lens. As an example, the light filter can include a sticky filter, such as a sticky filter available from Midsouth Photographic Specialties, Inc. of Jonesboro, Ark. As another example, the light filter can include a solar film. The filter of the solar film can be used to prevent or reduce saturation of the capture device capturing an image of the sun. As yet another example, the capture device 308 can include a view finder for a user to see the objects that can be captured by the capture device 308. As still yet another example, the capture device 308 can include a shutter switch or capture mechanism to trigger the capture device 308 capturing the representation of the objects viewable through the view finder or displayed on the display 320.

An image captured by the capture device can include a representation of the objects visible through the view finder at the time the image was captured. The representation within a captured image can include the representation of a celestial object such as the sun or the moon.

The user interface 310 can include an input element 316, an output element 318, and a display 320. The input element 316 can include one or more input components for inputting data into the alignment device 300. As an example, the input components for inputting data can include, but are not limited to, a keyboard, such as a QWERTY keyboard, a computing mouse, and a microphone and circuitry for receiving audible sounds, such as spoken commands. The output element 318 can include a speaker 322 to produce audible sounds such as audible alignment instructions, alignment adjustments, or audible alignment device setup instructions. The alignment instructions can indicate how an alignment adjustment can be performed. An alignment adjustment can indicate an amount of adjustment to be performed. A setup instruction can indicate how to perform a rough alignment of the SRD 106, how to attach an alignment device, and how to perform a fine alignment of the SRD 106.

The display 320 can include a liquid crystal display (LCD), a plasma display, a light emitting diode (LED) display, or another type of display. For example, the display 320 can include a touch screen display that can operate as at least a part of the input element 316 and as at least a part of the output element 318. A touch screen display can include, but is not limited to, a resistive touch screen panel or a capacitive touch screen panel. The display 320 can display (e.g., visually present) alignment instructions, alignment device setup instructions, an image captured by the capture device 308, a representation of a celestial object, a representation of the celestial object at an expected location, and other data. As an example, the representation of the celestial object at the expected location can be added to a capture image or overlaid upon the captured image.

The data storage device 312 can store various data including, but not limited to, any of the example data disclosed herein as being received, transmitted, captured or otherwise used by the alignment device 300 or any one or more components thereof. As an example, the data storage device 312 can store one or more of the CRPI 324, adjustment data 326, and celestial object data 328.

The CRPI 324 can comprise a variety of executable program instructions. In general, the CRPI 324 can, for example, include program instructions to perform any one or more of the functions disclosed herein as being performed by any alignment device or any one or more components of an alignment device disclosed herein. Particular examples of the CRPI 324 are described immediately hereafter and throughout thereafter.

For example, the CRPI 324 can include program instructions that are executable to determine a location, such as a location of the alignment device 300 or a location of an alignment device approximate to, attached to, or a part of an SRD. The determined location can include an adjustment location of an SRD.

As another example, the CRPI 324 can include program instructions that are executable to prompt a user to enter or to confirm accuracy of data that can be used to determine an alignment adjustment. The entry of such data and the confirmation of such data can occur by use of the input element 316. As an example, the entered or confirmed data can include data indicating a location, a day, a time, or some other condition local to the SRD 106.

As another example, the CRPI 324 can include program instructions that are executable to cause the display 320 to display multiple satellite indicators from and to receive by the user interface 310 a selection of a satellite indicator associated with a satellite to which the SRD 106 is to be peak aligned.

As another example, the CRPI 324 can include program instructions that are executable to perform any one or more of determining a captured image includes a celestial object, detecting a location of the celestial object within the captured image, detecting a center or an approximate center of the celestial object within the captured image, and detecting a brightest object within the captured image. Determining the captured image includes a celestial object can include one or more of classifying the brightest object within the captured image as the celestial object, determining the brightest object within the captured images is brighter than a brightness threshold, receiving, from the user interface 310, a selection of an image within the captured image as the celestial object, and receiving, from the user interface 310, a confirmation that an object within the captured image is a representation of a celestial object.

The adjustment data 326 can include one or more alignment adjustments, such as one or more of an alignment adjustment of the elevation alignment mechanism 112 and an alignment adjustment of the azimuth alignment mechanism 114. For example embodiments in which the elevation alignment mechanism 112 and the azimuth alignment mechanism 114 include rotatable knobs, the alignment adjustments can indicate a number of turns and a direction (e.g., clockwise or counterclockwise). The number of turns can include a complete turn aspect (e.g., one or more complete turns of 360 degrees). Additionally or alternatively, the number of turns can include a partial turn aspect (i.e., some number of degrees greater than zero and less than 360). The adjustment data 326 can include an alignment adjustment determined by the processor 302. Additionally or alternatively, the adjustment data 326 can include an alignment adjustment determined by the computing device 130.

The celestial object data 328 can include data that the processor 302 can reference or search to determine an expected capture location for a celestial object with respect to the alignment device 300 (e.g., with respect to a field of view 124 of the capture device 308). The celestial object data 328 can include data for a single SRD location or can include data for multiple SRD locations.

The alignment device 300 can request the computing device 130 to provide the celestial object data for one or more locations. A request for the computing device 130 to provide celestial object data can include one or more or a different parameter to restrict which celestial object data is provided in response to the request. The restriction parameter(s) can be provided so that there is less celestial object data to be transferred to the alignment device 300. In this way, the amount of data storage required to store the celestial object data at the alignment device is less and the time to transfer the data is shorter than if the celestial object data to be transferred is not restricted. As an example, the restriction parameters can include a date indicator or a time indicator that indicates a particular time (e.g., hour and minute) or a range of times (e.g., an hour and a number of minutes greater than one and less than sixty).

Table 1 shows example data that can be stored as part of the celestial object data 328. The columns indicate a day, a time of day, an SRD location, a zoom setting for the capture device 308, an attachment location of where the alignment device 300 is attached to the SRD 106, a grid location indicating a position of the display 320 at which a representation of expected location of a celestial object is to be displayed, and a pixel indicating a position of the display 320 at which a representation of expected location of a celestial object is to be displayed. The triple asterisks (i.e., "***") represent additional example data that can a part of the celestial object data 328, but which is not shown so as to keep the size of Table 1 to a convenient size.

TABLE 1

| Day | Time | SRD Location | Zoom Setting | Attachment Location | Grid Location | Pixel |
|---|---|---|---|---|---|---|
| 1 | 09:00:00 | 40°0'6"N 83°1'11"W | 1 | 0° | (F, 4) | (f, 24) |
| 1 | 09:00:00 | 40°0'6"N 83°1'11"W | 2 | 0° | (F, 4) | (f, 24) |
| *** | *** | *** | *** | *** | *** | *** |
| 49 | 13:43:00 | 40°0'6"N 83°1'11"W | 4 | 180° | (M, 13) | (m, 33) |
| 49 | 13:44:00 | 40°0'6"N 83°1'11"W | 1 | 180° | (D, 6) | (d, 26) |
| 49 | 13:44:00 | 40°0'6"N 83°1'11"W | 2 | 180° | (G, 8) | (g, 28) |
| 49 | 13:44:00 | 40°0'6"N 83°1'11"W | 3 | 180° | (J, 10) | (j, 30) |
| 49 | 13:44:00 | 40°0'6"N 83°1'11"W | 4 | 180° | (M, 12) | (m, 32) |
| 49 | 13:45:00 | 40°0'6"N 83°1'11"W | 1 | 180° | (D, 5) | (d, 25) |
| 49 | 13:45:00 | 40°0'6"N 83°1'11"W | 2 | 180° | (G, 7) | (g, 27) |
| 49 | 13:45:00 | 40°0'6"N 83°1'11"W | 3 | 180° | (J, 9) | (j, 29) |
| *** | *** | *** | *** | *** | *** | *** |
| 365 | 16:42:00 | 40°0'6"N 83°1'11"W | 4 | 270° | (P, 17) | (p, 37) |

Each day in Table 1 is represented by a number. For the Julian calendar, January $1^{st}$ can be represented by the number 1, February $18^{th}$ can be represented by the number 49, and December $31^{st}$, for a non-leap year, can be represented by the number 365. Other examples of how a day is represented in the celestial object data 328 are also possible.

Each time in Table 1 is represented by an hour on a 24 hour clock, a number of minutes in the hour, and a number of seconds within a minute. The celestial object data 328 can be configured such that data for certain times of each day are not included within the celestial object data 328. For example, if the celestial object data includes data regarding the sun, the celestial object data 328 would not have to include data for times before sunrise and times after sunset. As another example, the celestial object data 328 may include data regarding the sun for an optimum range of time occurring between sunrise and sunset during which satellite peaking can occur. For instance, the optimum range of time may include only five or fewer hours. As another example, if the celestial object data includes data regarding the Earth's moon, the celestial object data 328 could exclude data for times after moonrise and times before moonset, and could exclude data for dates on which a full moon is not visible. Other examples of how a time is represented in the celestial object data 328 are also possible.

Each SRD location in Table 1 is represented by a latitude (i.e., a number of degrees, minutes and seconds North or South), and a longitude (i.e., a number of degrees, minutes and seconds East or West). Other examples of how a SRD location is represented in the celestial object data 328 are also possible.

Each zoom setting in Table 1 is represented by a whole number. The number 1 can represent a 1× zoom setting, the number 2 can represent a 2× zoom setting, etc. The available zoom settings can be conditioned on the available zoom settings of the capture device 308. The zoom settings are not limited to a whole number zoom setting. For instance, a capture device can have a zoom setting such as 1.5× or 2.5×. Although the capture device 308 can have multiple zoom settings, the amount of data bytes required to store the celestial object data 328 can be reduced or minimized by storing the celestial object data 328 for less than all of the multiple zoom settings. For example, the celestial object data 328 can include data for just the 1× zoom setting even though the capture device 308 includes multiple zoom settings. Other examples of how a zoom setting is represented in the celestial object data 328 are also possible.

Each attachment location in Table 1 is represented as a number of degrees. Although the capture device 308 can have multiple attachment locations, the amount of data bytes required to store the celestial object data 328 can be reduced or minimized by storing the celestial object data 328 for less than all of the attachment locations. For example, the celestial object data 328 can include data for data for just the 0° attachment location even though the capture device 308 can be attached at multiple attachment locations.

Figure 4:
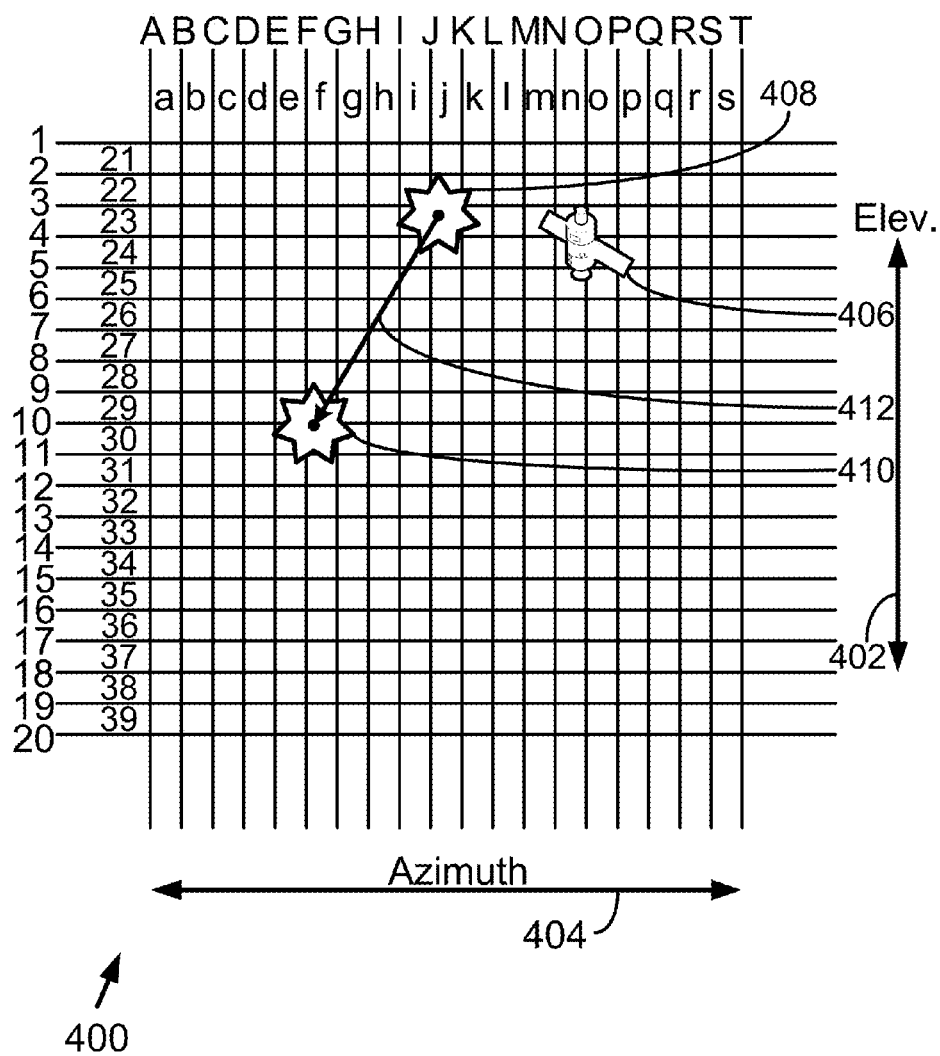
FIG. 4 depicts an alignment display in accordance with the example embodiments.

The expected capture locations of the representation of a celestial object in Table 1 are represented by a grid location listed as the intersection of a vertical gridline and a horizontal gridline or a pixel location as defined in the alignment display 400 (shown in FIG. 4). Other examples of how an expected capture location of a representation of a celestial object is represented in the celestial object data 328 are also possible.

Next, FIG. 4 depicts an example alignment display 400 that can be displayed by the display 320. An elevation dimension 402 and an azimuth dimension 404 are shown for reference. The alignment display 400 shows a view of the sky from a perspective of the capture device 308. The alignment display 400 shows a satellite 406, a celestial object 408, and a celestial object 410. The celestial object 410 is a visual representation of the sun 104 within an image captured by the capture device 308. The satellite 406 is a visual representation of the satellite 102 and the celestial object 408 is a visual representation of the sun 104 at its expected location within the display 320 based on the location of the alignment device 300, a time of day the image including the celestial object 410 is captured, and the day of the year. The processor 302 can cause the satellite 406 and the celestial object 408 to overlay the image including the celestial object 410. The satellite 102 typically would not be visible within the original captured image due to its size and distance from the capture device 308. The celestial object 408 representing the sun or the moon can be a part of original captured image.

The alignment display 400 is shown to include vertical grid lines A, B, C, D, E, F, G, H, I, J, K, L, M, N, O, P, Q, R, S, and T, and horizontal grid lines 1, 2, 3, 4, 5, 6, 7, 8, 9, 10, 11, 12, 13, 14, 15, 16, 17, 18, 19, and 20. The alignment display 400 does not require the vertical and horizontal gridlines or could use a different number of gridlines than shown in FIG. 4. The vertical and horizontal gridlines, whether visible or imaginary, can define a set of pixels that are identified by a lower case letter of the Latin alphabet within the range a to s, inclusive, and a number within the range 21 to 39, inclusive. For example, the upper-left-most pixel is identified as the (a, 21) pixel. Other examples of identifying pixels for the example embodiments using pixels are also possible.

The gridlines can be used to determine a center point or an approximate center point of an object within a captured image and to define a respective location within the display 320 at which the center point or the approximate center point of the object is located. Additionally or alternatively, the pixels can be used to determine a center point or an approximate center point of an object within a captured image and to define a respective location within the display 320 at which the center point or the approximate center point of the object is located.

The alignment display 400 is shown to take the shape of a square, but the shape of the alignment display 400 is not so limited. For example, the alignment display 400 can take the shape of a non-square rectangle. In this regard, the capture device 308 can be oriented to a portrait mode and then re-oriented to a landscape mode and vice versa. In the portrait mode, the alignment display 400 is longer in the elevation dimension 402 than in the azimuth dimension 404. In the landscape mode, the alignment display 400 is longer in the azimuth dimension 404 than in the elevation dimension 402.

The processor 302 can execute program instructions of the CRPI 324 to determine that the celestial object 410 is the brightest object in an original captured image and to determine a center point or the approximate center point of the celestial object 410 as grid location (M, 11) as the vertical gridline M and the horizontal gridline 11 intersect at the center point or the approximate center point of the celestial object 410 or are the pair of intersecting gridlines closest to the center point or the approximate center point of the celestial object 410. Similarly, the processor 302 can execute program instructions of the CRPI 324 to determine a center point or the approximate center point of the celestial object 408 as grid location (J, 3) as the vertical gridline J and the horizontal gridline 3 intersect at the center point or the approximate center point of the celestial object 408 or are the pair of intersecting gridlines closest to the center point or the approximate center point of the celestial object 408.

Additionally or alternatively, the processor 302 can execute program instructions of the CRPI 324 to determine that the center or the approximate center of the celestial object 408 is within pixel (j, 23) and that the center or the approximate center of the celestial object 410 is within pixel (m, 31). A difference between the locations pertaining to the celestial objects 408 and 410 is represented by a translation vector 412 that can include an azimuth dimension component and an elevation dimension component.

Figure 5:
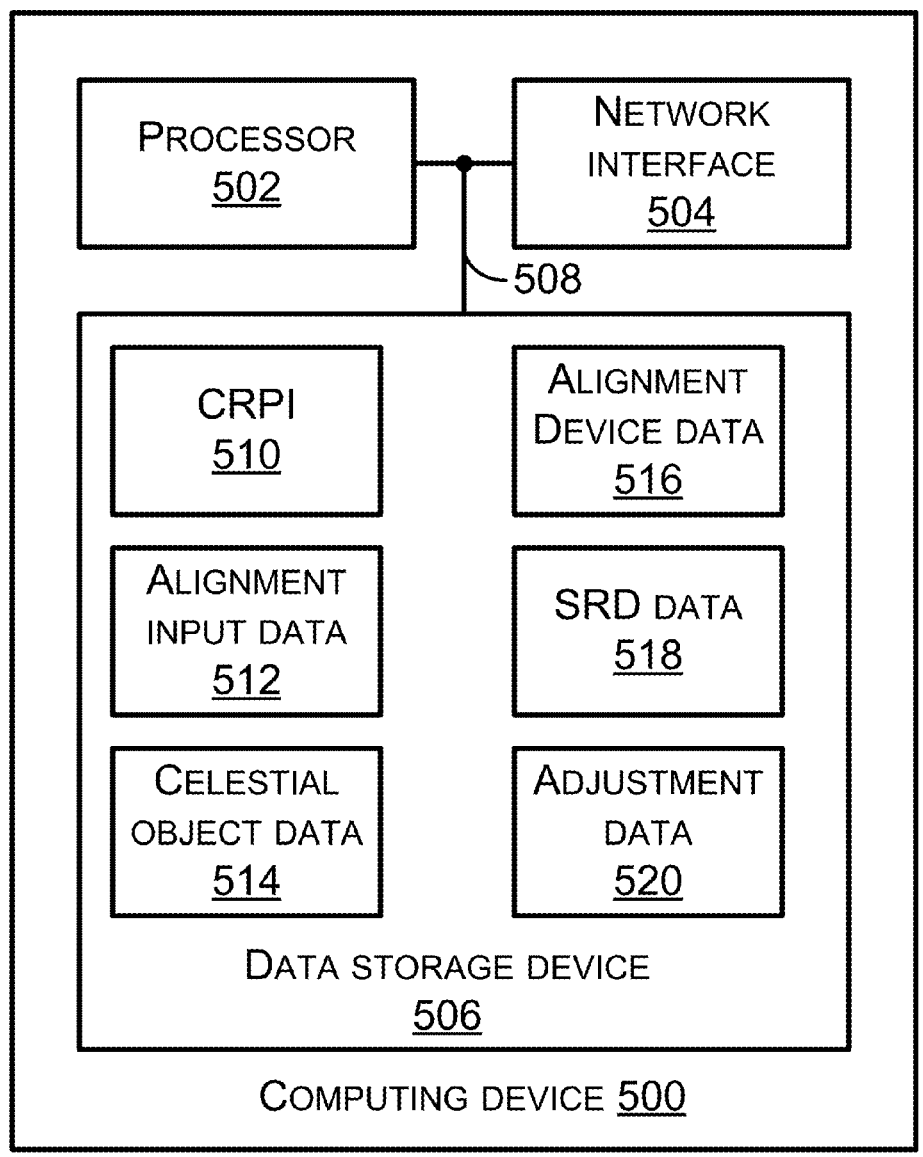
FIG. 5 is a block diagram of a computing device in accordance with the example embodiments.

Next, FIG. 5 is a block diagram of an example computing device 500. The computing device 500 can be configured to operate in the system 100 in addition to or in place of the computing device 130. The computing device 130 can include the computing device 500 or any one or more components thereof. Each of the computing devices 130 and 500 can be configured to operate as a server that serves one or more clients, at least one of which can be an alignment device such as alignment device 118 or 300. Hereinafter, the alignment device 300 is referenced in the description of FIG. 5, but the alignment device 118 is equally applicable to the description of FIG. 5 where alignment device 300 is mentioned. The computing devices 130 and 500 can be referred to as a "system" and as a "server."

As shown in FIG. 5, the computing device 500 includes a processor 502, a network interface 504, and a data storage device 506, two or more of which can be communicatively coupled or linked together via a system bus, network, or other connection mechanism 508.

The processor 502 can be configured to include any one of more of the general features disclosed herein with respect to any other processor disclosed herein. Furthermore, the processor 502 can be configured to execute CRPI, such as the CRPI 510.

The network interface 504 can be configured to include any one of more of the general features described above with respect to any other network interface disclosed herein. The network interface 504 can receive data transmitted over the communication network 126 such as, but not limited to, data transmitted by the alignment device 300. The network interface 504 can transmit data over the communication network 126 to the alignment device 300. As an example, the data transmitted by the network interface 504 can include data that causes the user interface 310 to prompt a user of the alignment device 300 to enter additional data to be used by the computing device 500 to determine alignment adjustments. As another example, the data transmitted by the network interface 504 can include alignment adjustments destined for the alignment device 300.

The data storage device 506 can be configured to include any one of more of the general features described above with respect to any other data storage device disclosed herein including, but not limited to, the features of the example computer-readable mediums. In particular, the data storage device 506 can store CRPI 510, alignment input data 512, celestial object data 514, alignment device data 516, SRD data 518, and adjustment data 520.

The network interface 504 can receive alignment input data from the alignment device 300 over the communication network 126 and provide that received data for storage as at least a part of the alignment input data 512. As an example, the alignment input data received from the alignment device 300 can include an SRD location associated with the SRD 106. As another example, the alignment input data received from the alignment device 300 can include an SRD location, a day, and a time (e.g., a time when the alignment device 300 captured an image of the sun while attached to the SRD 106).

As yet another example, the alignment input data received from the alignment device 300 can include an SRD location, a day, a time (e.g., a time when the alignment device 300 captured an image of the sun while attached to the SRD 106) and one or more of a zoom setting, an attachment location, a device-type indicator associated with the alignment device 300, an SRD-type indicator, and a satellite indicator. The zoom setting and the attachment location are described above with respect to Table 1. The device-type indicator and the SRD-type indicator and the other alignment input data can be used by the computing device 500 to select or determine the alignment adjustments to be sent back to the alignment device 300.

The device-type indicator can include, but is not limited to, a model name or number associated with a smartphone or a tablet device, a size of the display 320, an orientation (e.g., landscape or portrait) of the display 320 while the alignment device is attached to the SRD 106. The processor 502 can refer to the alignment device data 516 to determine one or more characteristics (e.g., a display size or resolution) associated with the alignment device 300 that has provided alignment input data to the computing device 500.

The SRD-type indicator can include, but is not limited to, a model number, model trade name, or manufacturer name associated with the SRD 106, one or more dimensions associated with the SRD (e.g., a radius of the SRD 106), and a model name or number or a one or dimensions associated with the alignment mechanism 110 attached to the SRD 106. The processor 502 can refer to the SRD data 518 to determine one or more characteristics (e.g., a dimension) associated with the SRD 106 or the alignment mechanism 110.

The satellite indicator can include, but is not limited to, a satellite indicator associated with a satellite to which the SRD is to be peak aligned. The computing device 500 can use the satellite indicator to select celestial object data from the celestial object data 514.

In accordance with any one or more of the foregoing examples regarding received alignment input data, the alignment input data can include a data file version of the image. A portion of the alignment input data can be determined by metadata included with the data file version of the image.

In accordance with any one or more of the foregoing examples regarding received alignment input data, the processor 502 can execute program instructions of the CRPI 510 to determine alignment adjustments for the alignment device 300 based on the received alignment input data and the celestial object data 514 selected based on the alignment input data.

In accordance with any one or more of the foregoing examples regarding received alignment input data, if the received alignment input data does not include any one or more of the day and time, then a day and time, such as the day and time at which the alignment input data is received by the network interface 504, can be determined by the computing device 500 for determining alignment adjustments to be provided to the alignment device that provided the alignment input data.

In accordance with any one or more of the foregoing examples regarding received alignment input data, the processor 502 can select a default alignment input if the received alignment input data does not receive a particular alignment input, such as a zoom setting, a display orientation, and an attachment location. As an example, the default zoom setting can be 1×, the default orientation can be a portrait orientation, and the default attachment location can be zero degrees (0°). Other examples of a selectable default alignment input are also possible.

The computing device 500 may search for and obtain the celestial object data needed for an alignment device to carry out a peak alignment to a satellite at each of one or more different adjustment locations. Since the computing device 500 can operate as a server to multiple alignment devices, the celestial object data 514 can include the celestial object data for peak aligning a SRD to a satellite at any of multiple adjustment locations, whereas an alignment device operated by an owner of a single SRD may have celestial object data within his or her alignment device for a single adjustment location. For each adjustment location represented by the celestial object data 328 or 514, the celestial object data can include data that indicates a position of a first celestial object (e.g., the sun or the moon) and the position of a second celestial object (e.g., the satellite to which an SRD is to be peak aligned). Although not required, to reduce the amount of data storage required to store celestial object data, the celestial object data 328 may include a subset of the celestial object data 514 for a given adjustment location. The subset may be conditioned on an adjustment time, a SRD-type indicator, a device-type indicator, a zoom setting, an attachment location or some other characteristic of a SRD, alignment device or alignment input data.

The alignment device data 516 can include alignment device data indicating at least one characteristic of one or more alignment devices. As an example, the at least one characteristic can include a display size of the alignment device, one or more display resolutions available on the alignment device, and one or more zoom settings available on the alignment device.

The SRD data 518 can include data that defines various features of one or more SRD. As an example, the various features can include, but are not limited to, dimensions of the SRD, the type of adjustment mechanism attached to the SRD, the type of LNB attached to the SRD, and the attachment positions of the SRD.

The adjustment data 520 can include each alignment adjustment determined for a SRD. In particular, the adjustment data 520 can include an azimuth alignment adjustment and an elevation alignment adjustment for the SRD 106. The computing device 500 can be configured to delete alignment adjustments after transmitting the alignment adjustments to an alignment device being used to align the SRD 106 or after some other trigger event.

The processor 502 can execute program instructions of the CRPI 510 to determine alignment adjustments to be provided to the alignment device 300. As an example, the processor 502 can refer to or search the celestial object data 514 to determine an expected capture location of a representation of a celestial object (e.g., the sun) based on some or all of the alignment input data received from the alignment device 300. The processor 502 can cause the alignment adjustments to be stored as at least a part of the adjustment data 520 and to provide the alignment adjustments to the network interface 504 for transmission of the alignment adjustments to the alignment device 300 over the communication network 126.

As another example, the processor 502 can refer to one or more of the alignment device data 516 and the SRD data 518 to determine at least one alignment adjustment for adjusting the alignment mechanism 110 attached to the SRD 106. The CRPI 510 can include any of the program instructions of the CRPI 324 disclosed herein.

III. Example Operation

Figure 6:
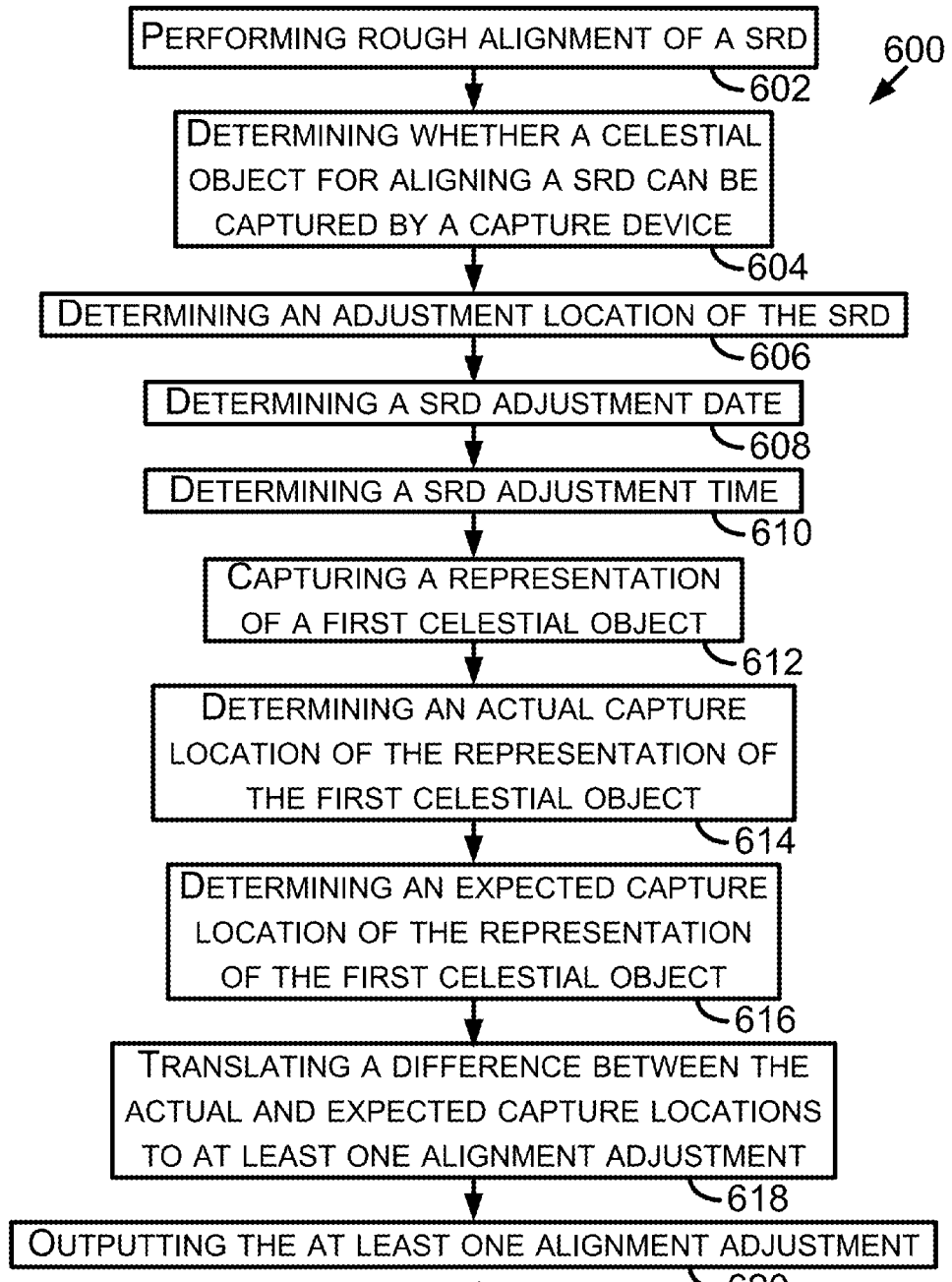
FIG. 6 is a flow chart showing a set of functions in accordance with the example embodiments.

Next, FIG. 6 is a flowchart depicting a set of functions 600 (or more simply "the set 600") that can be carried out in accordance with one or more example embodiments disclosed herein. The set 600 includes the functions shown in blocks labeled with even numbers 602 through 620 inclusive. The following description of the set 600 includes references to elements shown in other figures in this application, but the functions of the set 600 are not limited to be carried out by the referenced elements.

A variety of methods can be performed using one or more of the functions shown in the set 600. As an example, those various methods can differ based on which element(s) carry out the function. Some of the functions can be performed by multiple elements individually or collectively. The multiple elements performing one or more of the functions individually can perform the function in a similar manner or in different manner. As an example, the multiple elements can include the alignment device 300 (or a component thereof) and the computing device 500 (or a component thereof). A person having ordinary skill in the art will understand that a breakpoint defining which element performs a function for one of various methods can be varied with ease. Any function that includes a "determining" function can include a processor or the device including that processor "making a determination." Any method carried out using a function of the set 600 can be performed as part of a method including one or more other functions disclosed herein.

Block 602 includes performing a rough alignment of the SRD 106. Performing the rough alignment can include using a magnetic compass to align the SRD 106 within about four degrees (4°) of the optimum peak alignment position of the SRD 106. Additionally or alternatively, performing the rough alignment can include using a gyroscope or an accelerometer within the alignment device 300 (or in another device) to align the SRD 106 within about two degrees (2°) of the optimum alignment position of the SRD 106.

Next, block 604 includes determining whether a celestial object for aligning the SRD 106 can be captured by the capture device 308.

The alignment device 300 (e.g., the processor 302) can make the determination of block 604 in any of a variety of manners. For example, the processor 302 can execute program instructions to cause the display 320 to display a message to prompt a user to enter, via the input element 316, data that indicates whether the celestial object is visible, sufficiently visible, or not visible within the sky. The processor 302 can determine whether the celestial object can be captured based on the data entered by the input element 316. If the entered data indicates the celestial object is not visible, the display 320 can display a message that indicates that the alignment should be carried out at a time when the celestial object is visible or sufficiently visible within the sky. If the entered data indicates the celestial object is visible or sufficiently visible, the display 320 can display a message to guide the user to capture an image of the celestial object using the capture device 308. As another example, the processor 302 can determine whether the capture device 308 can capture an image of the celestial object based on a time of day or a weather report that indicates whether the sky is clear or cloudy.

The computing device 500 (e.g., the processor 502) can make the determination of block 604 in any of a variety of manners. For example, the processor 502 can make the determination of block 604 based on a time of day or a weather report that indicates whether the sky is clear or cloudy. As another example, the processor 502 can make the determination of block 604 based on a message the network interface 504 receives from the alignment device 300. That message can indicate a selection entered by the input element to indicate whether celestial object is visible, sufficiently visible, or not visible. The computing device 500 can cause an indication of the determination of block 604 to be transmitted to the alignment device 300 so that appropriate message regarding capturing an image can be output by the user interface 310. Other examples of the alignment device 300 or the computing device 500 determining whether the celestial object can be captured by the capture device 308 are also possible.

Next, block 606 includes determining an adjustment location of the SRD 106. Any one or more of the alignment device 300 and the computing device 500 can determine the SRD adjustment location.

The alignment device 300 can determine the SRD adjustment location by the processor 302 executing program instructions of the CRPI 324. The processor 302 can determine the adjustment location based on location data it receives from the location detector 304, from the network interface 306, or from the user interface 310. The processor 302 can convert the location data from a first form of location data (e.g., a street address, city, state, and mailing code) to a second form of location data (e.g., a latitude and longitude). Determining the adjustment location can include the display 320 displaying a prompt for the user to enter the location data and one or more fields (e.g., street address field) in which a user can enter location information by the user interface 310. Determining the adjustment location can include determining a geo location from metadata associated with an image captured by the alignment device 300 while the alignment device 300 is attached to the SRD 106.

The computing device 500 can determine the SRD adjustment location by the processor 502 executing program instructions of the CRPI 510. As an example, the processor 502 can determine the SRD adjustment location based on data the network interface 504 receives from the alignment device 300. As an example, the data from which the SRD adjustment location is determined by the computing device 500 can include the metadata associated with the captured image, a latitude and longitude determined by the processor 302 or the location detector 304, or a street address, city, state, and mailing code. As another example, the processor 502 can determine the SRD adjustment location based on customer data (a street address, city, state, and mailing code) regarding a customer that purchased the SRD 106. Other examples of the alignment device 300 or the computing device 500 determining the SRD adjustment location are also possible.

Next, block 608 includes determining a SRD adjustment date.

The alignment device 300 (e.g., the processor 302) can execute program instructions of the CRPI 324 to determine the SRD adjustment date based on the one of the following example determinations or in another manner. The processor 302 can determine the SRD adjustment date based on date data it receives from the location detector 304, from the network interface 306, or from the user interface 310. The date data can indicate a date or can include data from which a date can be determined. The processor 302 can convert the date data from a first form of date data (e.g., a GPS week and day-of-week number) to a second form of date data (e.g., a Julian calendar date). The processor 302 can determine the SRD adjustment date based on a calendar maintained by the alignment device 300. The processor 302 can cause the display 320 to display a prompt for the user to enter the date data and one or more fields (e.g., a month and date numeral) in which a user can enter date information by the user interface 310. The processor 302 can determine the SRD adjustment date from metadata associated with an image captured by the alignment device 300 while the alignment device 300 is attached to the SRD 106.

The computing device 500 (e.g., the processor 502) can execute program instructions of the CRPI 510 to determine the SRD adjustment date based on the one of the following example determinations or in another manner. The processor 502 can determine the SRD adjustment date based on data the network interface 504 receives from the alignment device 300. As an example, the data from which the SRD adjustment date is determined by the computing device 500 can include the metadata associated with the captured image or an SRD adjustment date determined by the alignment device 300. The processor 502 can determine the SRD adjustment date from a calendar maintained by the computing device 500 and the date on which a request for alignment adjustment is received by the network interface 504 from the alignment device 300. Other examples of the alignment device 300 or the computing device 500 determining the SRD adjustment date are also possible.

Next, block 610 includes determining a SRD adjustment time. Any one or more of the alignment device 300 and the computing device 500 can determine the SRD adjustment time.

The alignment device 300 (e.g., the processor 302) can execute program instructions of the CRPI 324 to determine the SRD adjustment time based on the one of the following example determinations or in another manner. The processor 302 can determine the SRD adjustment time based on time data it receives from the location detector 304, from the network interface 306, or from the user interface 310. The processor 302 can receive the time data from a clock (not shown in the figures) within the alignment device 300. As an example, the time data can indicate a time or can include data from which a time can be determined. The processor 302 can convert the time data from a first form of time data (e.g., an hour, a minute, an AM or PM indicator, and a daylight savings time indicator) to a second form of time data (e.g., a Universal Coordinated Time). The processor 302 can cause the display 320 to display a prompt for the user to enter the time data and one or more fields (e.g., an hour field, a minute field, an AM or PM indicator field, and a daylight savings time indicator field) in which a user can enter time information by the user interface 310. The processor 302 can determine the SRD adjustment time from metadata associated with an image captured by the alignment device 300 while the alignment device 300 is attached to the SRD 106.

The computing device 500 (e.g., the processor 502) can execute program instructions of the CRPI 510 to determine the SRD adjustment time based on the one of the following example determinations or in another manner. The processor 502 can determine the SRD adjustment time based on data the network interface 504 receives from the alignment device 300. The processor 502 can adjust that time if the computing device 500 and the alignment device 300 are in different time zones. As an example, the data from which the SRD adjustment time is determined by the computing device 500 can include the metadata associated with the captured image or an SRD adjustment time determined by the alignment device 300. The processor 502 can determine the SRD adjustment time from a clock maintained by the computing device 500 and the time at which a request for alignment adjustment is received by the network interface 504 from the alignment device 300. Other examples of the alignment device 300 or the computing device 500 determining the SRD adjustment time are also possible.

Next, block 612 includes capturing a representation of a first celestial object. The capture device 308 can be used to capture the representation of the first celestial object. The captured representation can be stored as an image file (e.g., a JPEG or JPG file) within the data storage device 312. The first celestial object can be the sun or the moon. The image including the first celestial object can be captured while the first celestial object is viewable through a view finder of the capture device 308 or while the first celestial object is displayed on display 320 as a live image detected by the capture device 308. The live image of the first celestial object may not be stored as the captured image until a shutter switch or capture mechanism is activated. The image including the first celestial object can be captured while the capture device 308 or the alignment device 300 is fixedly attached to the SRD 106. The first celestial object does not have to remain in the field of view of the capture device to carry out the peak alignment after the representation of the first celestial object is captured.

The network interface 306 can transmit the captured image to the network interface 504 over the communication network 126. The processor 502 can cause the captured image to be stored within the data storage device 506.

Next, block 614 includes determining an actual capture location of the representation of the first celestial object. Any one or more of the alignment device 300 and the computing device 500 can determine the SRD adjustment time. As an example, the actual capture location can be a location of the representation of the first celestial object as displayed by the display 320 or as stored within the data storage device 312 or 506.

The alignment device 300 can determine the actual capture location of the representation of the first celestial object by the processor 302 executing program instructions of the CRPI 324. The processor 302 can determine a brightest spot of the captured image and to determine a center or an approximate center of the brightest spot. The use of a filter or a film on or over the lens of the capture device 308 can enhance an ability of the processor 302 to determine the brightest spot of the captured image. The processor 302 can use the location of the brightest spot or the center or the approximate center of the brightest spot as the actual capture locations of the representation of the first celestial object. The processor 302 can associate and refer to the bright spot, the center of the bright spot, or the approximate center of the bright spot by a pair of grids, a pixel, or by some other identifiers. The processor 302 can prompt a user to select an object within a captured image to be the representation of the first celestial object. This can result in a quicker determination of the actual capture location or can be used as confirmation of another determination of the actual capture location. As an example, the user interface 310 can receive a selection of the celestial object 408 in the alignment display 400 or 700 (shown in FIG. 7) as the representation of the first celestial object.

The computing device 500 can determine the actual capture location of the representation of the first celestial object by the processor 502 executing program instructions of the CRPI 510. The network interface 504 can receive the image including the first celestial object. The processor 502 can determine a brightest spot of the captured image and to determine a center or an approximate center of the brightest spot. The use of a filter or a film on or over the lens of the capture device 308 can enhance an ability of the processor 502 to determine the brightest spot of the captured image. The processor 502 can use the location of the brightest spot or the center or the approximate center of the brightest spot as the actual capture locations of the representation of the first celestial object. The processor 502 can associate and refer to the bright spot, the center of the bright spot, or the approximate center of the bright spot by a pair of grids, a pixel, or by some other identifiers. The processor 502 can cause the network interface 504 to transmit a message that causes the user interface 310 to display a prompt for selecting an object within a captured image to be the representation of the first celestial object. The network interface 504 can receive an indication of selected object to determine the actual capture location or to confirm another determination of the actual capture location. Other examples of the alignment device 300 or the computing device 500 determining an actual capture location of the representation of the first celestial object are also possible.

Figure 7:
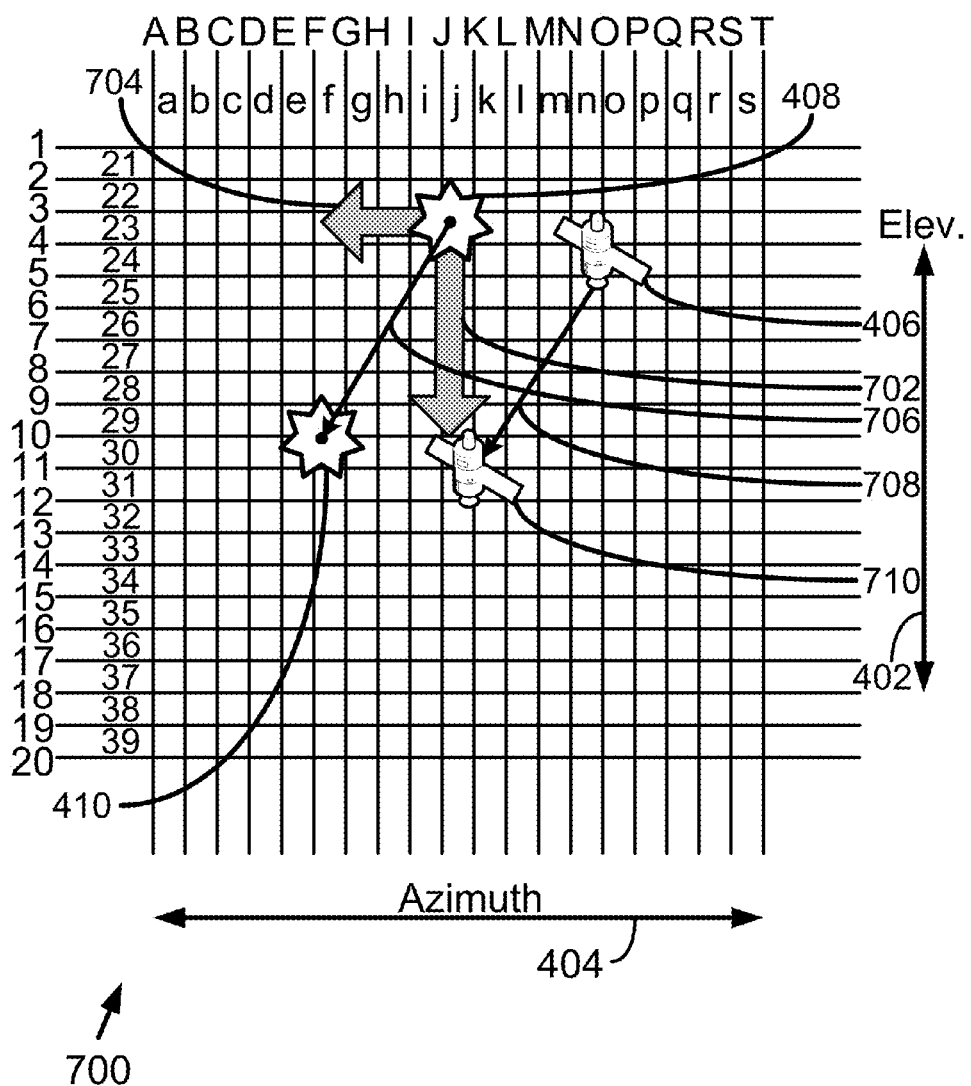
FIG. 7 depicts another alignment display in accordance with the example embodiments.

Next, block 616 includes determining an expected capture location of the representation of the first celestial object. Similar to the actual location of the representation of the first celestial object, the expected capture location can be a location of the representation of the first celestial object as displayed by the display 320 or as stored within the data storage device 312. The celestial object 410 in FIG. 4 and in FIG. 7 is an example of an expected location of the first celestial object within the display 320.

The alignment device 300 can determine the expected capture location of the representation of the first celestial object by the processor 302 executing program instructions of the CRPI 324. The processor 302 can determine the expected location of the representation of the first celestial object based on (i.e., conditioned on) the adjustment location determined at block 606, the SRD adjustment date determined at block 608, the SRD adjustment time determined at block 610, and the SRD 106 being in a particular alignment with a second celestial object. The second celestial object can be the satellite 102 or a component thereof, such as a transmitter of the satellite 102. As an example, the particular alignment can be an alignment in which the SRD 106 is peaked with the second celestial object or an alignment in which the SRD 106 is approximately peaked (e.g., within two degrees of being peaked) with the second celestial object. The processor 302 can determine the expected capture location by referring to the celestial object data 328.

The computing device 500 can determine the expected capture location of the representation of the first celestial object by the processor 502 executing program instructions of the CRPI 510. The processor 502 can determine the expected capture location by referring to the celestial object data 514. The processor 502 can base that determination on the adjustment location determined at block 606, the SRD adjustment date determined at block 608, the SRD adjustment time determined at block 610, and the SRD 106 being in a particular alignment with a second celestial object. Other examples of the alignment device 300 or the computing device 500 determining an expected capture location of the representation of the first celestial object are also possible.

Next, block 618 includes translating a difference between the actual and expected capture locations to at least one alignment adjustment. Any one or more of the alignment device 300 and the computing device 500 can execute program instructions to determine the at least one alignment adjustment. As an example, the at least one alignment adjustment can be determined by a difference in the grid locations or pixel locations. For example, the difference between two gridlines parallel to the azimuth dimension for a particular zoom setting and display resolution can equate a one quarter clockwise turn (i.e., 90°) of the elevation adjustment mechanism 112. A number of pixels can equate to the same one quarter clockwise turn (i.e., 90°) of the elevation adjustment mechanism 112. A difference between two gridlines parallel to the elevation dimension for the particular zoom setting and display resolution can equate to a number of turns of the azimuth adjustment mechanism 114. An expected capture location being to the left, right, above or below an actual capture location of a representation of a celestial object can be used to determine whether an adjustment mechanism is turned clockwise or counterclockwise.

Next, block 620 includes outputting the at least one alignment adjustment. Any one or more of the alignment device 300 and the computing device 500 can output the at least one alignment adjustment.

The alignment device 300 (e.g., the processor 302) can execute program instructions of the CRPI 324 to output the at least one alignment adjustment using one or more of the following example output functions or in another manner. The processor 302 or another element of the alignment device 300 can provide the alignment adjustment to the display 320 for visually outputting the at least one alignment adjustment. The processor 302 or another element of the alignment device 300 can provide the alignment adjustment to the speaker 322 for audibly outputting the at least one alignment adjustment. An alignment adjustment, regardless of whether it is output visually, audibly or otherwise, can include at least one of an azimuth positioning alignment adjustment and an elevation positioning alignment adjustment. Additionally or alternatively, an alignment adjustment can indicate a number of turns of an alignment mechanism as discussed above or some other adjustment to an alignment mechanism for adjusting an azimuth or elevation position of the SRD 106.

The computing device 500 (e.g., the processor 502) can execute program instructions of the CRPI 510 to output the at least one alignment adjustment using one or more of the following example output functions or in another manner. The processor 502 can provide the at least one alignment adjustment to the network interface 504 and cause the network interface 504 to transmit the at least one alignment adjustment to the alignment device 300 over the communication network 126. The at least one alignment adjustment output by the computing device 500 can be received by the network interface 306 and output by one or more of the components of the user interface 310 as discussed in the preceding paragraph.

After the adjustment mechanisms are adjusted in accordance with the alignment adjustments, multiple functions of the set 600 can be repeated to verify the adjustment. For example, another SRD adjustment time can be determined (similar to block 610), and another representation of the first celestial object can be captured at the other SRD adjustment time on the SRD adjustment date. Thereafter, an actual capture location of the second representation of the first celestial object can be determined and an expected capture location of second representation of the first celestial object can be determined based on the other SRD adjustment time and the other factors on which the expected capture location of the first representation of the first celestial object was made. If the alignment adjustments output at block 620 were carried out properly, it would be expected that the actual and expected locations of the second representations of the first celestial object would overlap or be substantially close to one another such that the SRD 106 would be peak aligned even if no further adjustment to the alignment mechanisms are carried out.

Next, FIG. 7 depicts an example alignment display 700 that can be displayed by the display 320 as part of outputting an alignment adjustment visually at block 620. The elevation dimension 402, the azimuth dimension 404, the satellite 406, and the celestial object 408, as described with respect to FIG. 4, are included within the alignment display 700. The alignment display 700 also includes an expected capture location 410 of the celestial object (e.g., the sun 104) and an expected satellite position 710 of the satellite 102 with respect to the expected capture location 410. The expected capture location 410 can be at different locations within the alignment display 700 depending on among other things, the SRD location, the time of day, and the day of the year. The satellite 102 is offset from sun by a known vector and thus movement of the SRD 106 such that the celestial object 408 at its actual capture location to the expected capture location 410 would cause the SRD to be in peak alignment with the satellite 102.

The alignment display 700 includes an elevation adjustment 702, an azimuth adjustment 704, a desired net movement 706 pertaining to the displayed celestial object 408, and a desired net movement 708 pertaining to the displayed satellite 406. The desired net movements 706 and 708 represent a net adjustment of an azimuth adjustment and an elevation adjustment that would put the SRD 106 into peak alignment for reception of downlink signals from the satellite 102. In other words, moving the celestial object 408 to the expected capture location 410 causes the SRD 106 to point correctly to a desired satellite (e.g., the satellite 102).

The length of the elevation adjustment 702 and the length of the azimuth adjustment 704 can represent or be translated into adjustments of the elevation alignment mechanism 112 and the azimuth alignment mechanism 114, respectively. As an example, one or more of those adjustments can indicate a number of degrees or a distance to rotate an alignment mechanism. In accordance with one or more example embodiments, the display 320 can output one or more of an azimuth adjustment and an elevation adjustment textually in addition to or as an alternative to the elevation adjustment 702 and the azimuth adjustment 704. The elevation adjustment 702 can include or be referred to as an elevation vector. The azimuth adjustment 704 can include or be referred to as an azimuth vector. Those vectors can have a direction and magnitude. The magnitude can indicate the number of degrees or the distance to rotate an alignment mechanism. The direction can indicate whether to turn an adjustment mechanism clockwise or counterclockwise.

Figure 8:
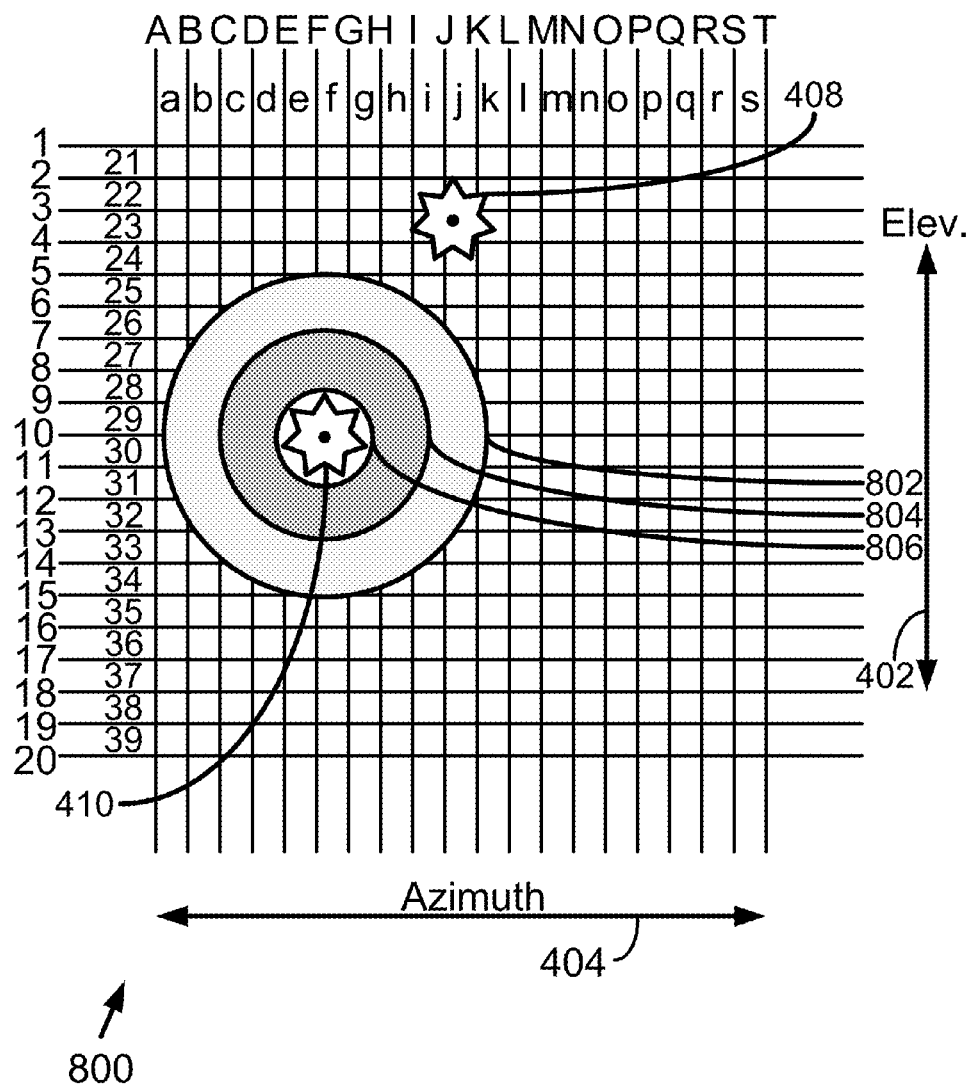
FIG. 8 depicts another alignment display in accordance with the example embodiments.

Next, FIG. 8 depicts an example alignment display showing example results of performing the example SRD alignment methods disclosed herein. As explained a rough adjustment of the SRD 106 can be performed by use of one or more of a magnetic compass, an accelerometer, or a gyroscope. The accelerometers and gyroscopes are not used to determine an azimuth pointing of the SRD 106 because those devices are based off of an offset from the Earth's gravity vector. A magnetic compass, however, can be used to perform a rough azimuth pointing of the SRD 106.

An accelerometer, gyroscope, or magnetic compass is used for a rough alignment of the SRD 106 due to the pointing error possible through use of those devices. The accelerometers and gyroscopes can have approximately two degrees (2°) of pointing error. The magnetic compasses available in a current smartphone or tablet device can have approximately four degrees (4°) of pointing error. The rough adjustments performed through use of an accelerometer, gyroscope, or magnetic compass of a smartphone or tablet device may have around four degrees (4°) to five degrees (5°) of pointing error. This amount of pointing error can result in the SRD 106 not receiving any downlink signals from a satellite to which the SRD is to be pointed or from any adjacent satellite.

In order to peak align the SRD 106, the SRD 106 should be within one degree (1°) of a peak pointing vector. That one degree (1°) of variation from the peak pointing vector can vary based on a beam width of the SRD 106 and the satellite 102 to which the SRD 106 is being aimed. The one degree (1°) of accuracy can be obtained by using the alignment device 300 for alignment of the SRD 106 through use of capturing an image of the sun as the sun 104 has a half degree (0.5°) look angle from the surface of the Earth 202.

FIG. 8 depicts three error circles of uncertainty that can result from using the example SRD alignment methods disclosed herein. The circle of uncertainty 802 represents a predicted accuracy through use of a magnetic compass to perform a rough alignment of the SRD 106. The circle of uncertainty 804 represents a predicted accuracy through use of an accelerometer or a gyroscope to perform a rough alignment of the SRD 106. The circle of uncertainty 806 represents a predicted accuracy through use of the sun capture to perform a fine alignment of the SRD 106. Aligning the SRD 106 such that a representation of the sun captured by the capture device 308 would be within the circle of uncertainty 802 or 804 is most likely unsuitable for a final pointing of the SRD 106, but can be a good start to guide a user through use of the sun capture to perform a fine alignment of the SRD 106.

V. Conclusion

Example embodiments have been described above. Those skilled in the art will understand that changes and modifications can be made to the described embodiments without departing from the true scope and spirit of the present disclosure.

We claim:

1. A method comprising:
    determining, by a processor, an adjustment location of a satellite receiver dish (SRD);
    determining, by the processor, a SRD adjustment date;
    determining, by the processor, a SRD adjustment time;
    determining, by the processor, an actual capture location pertaining to a representation of a first celestial object within a captured image;
    determining, by the processor, an expected capture location for the representation of the first celestial object within the captured image based on the adjustment location, the SRD adjustment date, the SRD adjustment time, and the SRD being in a particular alignment with a second celestial object;
    translating, by the processor, a difference between the actual capture location for the representation of the first celestial object and the expected capture location for the representation of the first celestial object to at least one alignment adjustment of the SRD for positioning the SRD in the particular alignment with the second celestial object; and
    outputting, by the processor, the at least one alignment adjustment.

2. The method of claim 1, further comprising:
    capturing, by a capture device at the SRD, the representation of the first celestial object,
    wherein the processor that outputs the at least one alignment adjustment is within an alignment device that includes the capture device.

3. The method of claim 2,
    wherein the processor that determines the adjustment location comprises is within one of a smartphone or a tablet device,
    wherein the capture device comprises a camera within the smartphone or the tablet device, and
    wherein determining the adjustment location includes the processor determining the adjustment location from global positioning system data generated by the smartphone or the tablet device.

4. The method of claim 2, wherein capturing the representation of the first celestial object occurs at the determined SRD adjustment time on the SRD adjustment date.

5. The method of claim 2, wherein capturing the representation of the first celestial object includes capturing an image of the first celestial object.

6. The method of claim 1, wherein the at least one alignment adjustment includes at least one of an adjustment of an SRD azimuth adjustment mechanism at the SRD and an adjustment of an SRD elevation adjustment mechanism at the SRD.

7. The method of claim 1, wherein both the actual capture location and the expected capture location are specified as at least one of a pixel position within a display of a capture device and a display grid position within the display of the capture device.

8. The method of claim 1, wherein outputting the at least one alignment adjustment includes outputting at least one of an audible adjustment indicator and a visual adjustment indicator.

9. The method of claim 1, wherein determining the actual capture location includes determining a location of a bright object within the representation of the first celestial object and determining at least one of a center of the bright object and an approximate center of the bright spot.

10. The method of claim 1, wherein the first celestial object is a sun and the second celestial object is a satellite in a geostationary orbit around Earth.

11. The method of claim 1, wherein outputting the at least one alignment adjustment includes outputting at least one of an azimuth adjustment for a first alignment mechanism attached to the SRD and an elevation adjustment for a second alignment mechanism attached to the SRD.

12. A system comprising:
    a processor; and
    a computer-readable medium storing computer-readable program instructions that when executed by the processor cause a set of functions to be performed,
    wherein the set of functions includes:
    determining an adjustment location of a satellite receiver dish (SRD);
    determining a SRD adjustment date;
    determining a SRD adjustment time;
    determining an actual capture location pertaining to a representation of a first celestial object within a captured image;
    determining an expected capture location for the representation of the first celestial object within the captured image based on the adjustment location, the SRD adjustment date, the SRD adjustment time, and the SRD being in a particular alignment with a second celestial object;
    translating, by the processor, a difference between the actual capture location for the representation of the first celestial object and the expected capture location for the representation of the first celestial object to at least one alignment adjustment of the SRD for positioning the SRD in the particular alignment with the second celestial object; and outputting the at least one alignment adjustment.

13. The system of claim 12, further comprising:

a network interface to perform at least one of transmitting the adjustment location of the SRD to a server and receiving, from the server, celestial object data for determining the expected capture location for the representation of the first celestial object based on the adjustment location, the SRD adjustment date, the SRD adjustment time, and the SRD being in a particular alignment with a second celestial object.

14. The system of claim 12, further comprising:

a network interface to perform at least one of receiving the adjustment location of the SRD from an alignment device and transmitting, to the alignment device, celestial object data for determining the expected capture location for the representation of the first celestial object based on the adjustment location, the SRD adjustment date, the SRD adjustment time, and the SRD being in a particular alignment with a second celestial object.

15. The system of claim 12, further comprising:

an alignment device that includes the processor and the computer-readable medium; and an attachment device configured to fixedly attach the alignment device to the SRD or to a second attachment device that is fixedly attached to the SRD.

16. The system of claim 15, wherein the alignment device includes a smartphone or a tablet device.

17. The system of claim 15, wherein the alignment device further includes a location detector to determine the adjustment location of the SRD.

18. The system of claim 15, wherein the alignment device further includes a user interface, and wherein outputting the at least one alignment adjustment includes at least one of visually displaying the at least one alignment adjustment by a display of the user interface and audibly playing the at least one alignment adjustment by a speaker of the user interface.

19. The system of claim 15, wherein the alignment device further includes a capture device that captures the representation of the first celestial object.

20. A non-transitory computer-readable medium storing program instructions, that when executed by a processor, cause a set of functions to be performed, wherein the set of functions includes:

determining an adjustment location of a satellite receiver dish (SRD);

determining a SRD adjustment date;

determining a SRD adjustment time;

determining an actual capture location pertaining to a representation of a first celestial object with a captured image;

determining an expected capture location for the representation of the first celestial object within the captured image based on the adjustment location, the SRD adjustment date, the SRD adjustment time, and the SRD being in a particular alignment with a second celestial object;

translating a difference between the actual capture location for the representation of the first celestial object and the expected capture location for the representation of the first celestial object to at least one alignment adjustment of the SRD for positioning the SRD in the particular alignment with the second celestial object; and outputting the at least one alignment adjustment.

* * * * *